United States Patent
Kamei et al.

(12)

(10) Patent No.: US 11,240,412 B2
(45) Date of Patent: Feb. 1, 2022

(54) IMAGING APPARATUS AND TEXT DISPLAY METHOD

(71) Applicant: FUJIFILM Corporation, Tokyo (JP)

(72) Inventors: Keita Kamei, Tokyo (JP); Kazuhisa Horikiri, Tokyo (JP); Hirotoshi Ono, Tokyo (JP); Rena Kamoda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 12 days.

(21) Appl. No.: 16/706,210

(22) Filed: Dec. 6, 2019

(65) Prior Publication Data

US 2020/0112661 A1    Apr. 9, 2020

Related U.S. Application Data

(63) Continuation of application No. PCT/JP2017/045541, filed on Dec. 19, 2017.

(30) Foreign Application Priority Data

Jun. 23, 2017 (JP) .............................. JP2017-123537

(51) Int. Cl.
*H04N 5/225* (2006.01)
*G06F 40/109* (2020.01)
(Continued)

(52) U.S. Cl.
CPC ....... *H04N 5/22525* (2018.08); *G06F 40/109* (2020.01); *G06F 40/56* (2020.01);
(Continued)

(58) Field of Classification Search
CPC ........... H04N 5/22525; H04N 1/00188; H04N 5/2252; H04N 5/232; G06F 40/109;
(Continued)

(56) References Cited

U.S. PATENT DOCUMENTS

| 2005/0140813 A1 | 6/2005 | Wani | |
| 2010/0053861 A1* | 3/2010 | Kim | H04M 1/22 361/679.01 |

(Continued)

FOREIGN PATENT DOCUMENTS

| JP | 2001-268422 A | 9/2001 |
| JP | 2005-110162 A | 4/2005 |

(Continued)

OTHER PUBLICATIONS

International Search Report issued in PCT/JP2017/045541; dated Mar. 13, 2018.

(Continued)

*Primary Examiner* — Gevell V Selby
(74) *Attorney, Agent, or Firm* — Studebaker & Brackett PC

(57) ABSTRACT

An imaging apparatus and a text display method capable of checking an imageable range of a subject without displaying a live view image and also capable of displaying a text corresponding to audio around the subject or an ambient sound on the apparatus main body are provided. The imaging apparatus includes a transparent casing, an imaging unit that is arranged in the casing and acquires a captured image of a subject, a transparent display unit that is arranged in the casing and includes a display screen orthogonal to an imaging direction of the imaging unit, a sound collection unit that includes a microphone and acquires audio or an ambient sound, a text generation unit that generates a text based on the audio or the ambient sound acquired by the sound collection unit, and a display control unit that displays the text generated by the text generation unit on the display unit.

19 Claims, 18 Drawing Sheets

(51) Int. Cl.
*G06F 40/56* (2020.01)
*H04N 1/00* (2006.01)
*H04R 5/027* (2006.01)

(52) U.S. Cl.
CPC ....... *H04N 1/00188* (2013.01); *H04N 5/2252* (2013.01); *H04R 5/027* (2013.01)

(58) Field of Classification Search
CPC ......... G06F 40/56; H04R 5/027; H04R 1/028; G03B 31/00; G10L 15/26; G06K 9/00711; G06K 9/00671
See application file for complete search history.

(56) References Cited

U.S. PATENT DOCUMENTS

| | | | | |
|---|---|---|---|---|
| 2010/0194880 | A1* | 8/2010 | Furutani | G03B 15/00 348/135 |
| 2013/0260360 | A1* | 10/2013 | Baurmann | G06F 3/013 434/365 |
| 2013/0293581 | A1* | 11/2013 | Wissner-Gross | H04N 21/812 345/633 |
| 2014/0081634 | A1* | 3/2014 | Forutanpour | G10L 15/26 704/235 |
| 2014/0347267 | A1 | 11/2014 | Nishi et al. | |
| 2017/0098449 | A1* | 4/2017 | Horiuchi | H04N 5/77 |
| 2018/0047395 | A1* | 2/2018 | Sommers | G06F 40/169 |

FOREIGN PATENT DOCUMENTS

| | | |
|---|---|---|
| JP | 2007-266793 A | 10/2007 |
| JP | 2010-183378 A | 8/2010 |
| JP | 2013-205526 A | 10/2013 |
| JP | 2014-216904 A | 11/2014 |

OTHER PUBLICATIONS

International Preliminary Report On Patentability and Written Opinion issued in PCT/JP2017/045541; dated Dec. 24, 2019.

Kazuhisa Horikiri et al.; "FUJIFILM & FUJI Xerox 'instax movie' (2016)"; AXIS; AXIS inc.; Dec. 29, 2016.

Kazuhisa Horikiri et al.; "Prototype Cheki Movie by FUJIFILM Design x FUJI XEROX Design"; FUJIFILM Corporation; Jan. 23, 2017; http://design.fujifilm.com/ja/chekimovie/design/.

* cited by examiner

IMAGING APPARATUS AND TEXT DISPLAY METHOD

CROSS-REFERENCE TO RELATED APPLICATIONS

The present application is a Continuation of PCT International Application No. PCT/JP2017/045541 filed on Dec. 19, 2017 claiming priority under 35 U.S.C § 119(a) to Japanese Patent Application No. 2017-123537 filed on Jun. 23, 2017. Each of the above applications is hereby expressly incorporated by reference, in its entirety, into the present application.

BACKGROUND OF THE INVENTION

1. Field of the Invention

The present invention relates to an imaging apparatus and a text display method and particularly, to a technology for displaying a text generated from collected audio and the like on a display unit of an imaging apparatus.

2. Description of the Related Art

In the related art, an imaging apparatus disclosed in JP2014-216904A is known as such a type of imaging apparatus.

During an imaging preparation period for a target image, the imaging apparatus disclosed in JP2014-216904A converts acoustic signals of a subject and an imaging person obtained by sound collection into text data and displays a live view image and the text data on a display unit of the imaging apparatus.

Then, in a case where a shutter operation is input, the target image is captured, and an image file storing image data of the target image and the text data is recorded on a recording medium.

In the disclosure of JP2014-216904A, the display position of the text data gradually moves from the right side to the left side of the display screen of the display unit (a display process of causing the text to gradually flow on the display screen is performed).

JP2001-268422A discloses a printer-equipped imaging apparatus. In the printer-equipped imaging apparatus, a front cover, a rear cover, a slot cover of a recording medium, and a battery cover constituting the exterior of the apparatus are formed of a light-transmitting resin, and the inside of the printer-equipped imaging apparatus can be seen.

SUMMARY OF THE INVENTION

The imaging apparatus disclosed in JP2014-216904A displays the text data indicating the acoustic signals of the subject and the imaging person obtained by sound collection in a superimposed manner on the live view image displayed on the display unit of the imaging apparatus. Accordingly, by seeing the live view image (display image), a user (imaging person) can check an imaged range (composition) of the subject and can check the text data related to the image in a case where the image is captured.

However, the imaging apparatus disclosed in JP2014-216904A displays the text data in a superimposed manner on the live view image. Thus, for example, a problem arises in that the load of signal processing for display is increased compared to a case where only the text data is displayed, and an electric power consumption is also increased.

In the printer-equipped imaging apparatus disclosed in JP2001-268422A, the front cover, the rear cover, and the like constituting the exterior of the apparatus are formed of a light-transmitting resin. Thus, while the inside of the apparatus can be seen, light is blocked by a content (an optical printer module and the like including a film pack accommodating an instant film) that is accommodated inside the apparatus and occupies a large area. Thus, the imaging apparatus itself cannot be made transparent. That is, in the imaging apparatus disclosed in JP2001-268422A, the apparatus cannot be made transparent from an ocular side to an objective side.

The present invention is conceived in view of such matters. An object of the present invention is to provide an imaging apparatus and a text display method capable of checking an imageable range of a subject without displaying a live view image and also capable of displaying a text corresponding to audio around the subject or an ambient sound on the apparatus main body.

In order to achieve the object, an imaging apparatus according to one aspect of the present invention comprises a transparent casing, an imaging unit that is arranged in the casing and acquires a captured image of a subject, a transparent display unit that is arranged in the casing and includes a display screen orthogonal to an imaging direction of the imaging unit, a sound collection unit that acquires audio or an ambient sound, a text generation unit that generates a text based on the audio or the ambient sound acquired by the sound collection unit, and a display control unit that displays the text generated by the text generation unit on the display unit.

According to one aspect of the present invention, the inside of the apparatus and also the opposite side can be seen through the apparatus due to the transparent casing and the transparent display unit. Accordingly, an imageable range of the subject can be checked. In addition, the text generated based on the collected audio or ambient sound can be displayed on the transparent display unit, and appropriate text information representing a surrounding scene, atmosphere, or the like can be provided to a user. In addition, by displaying the text on the transparent display unit disposed in the transparent casing, the text can be displayed in a superimposed manner on the subject that is seen through the transparent casing and the display unit. Furthermore, it is possible to give feeling that the imaging apparatus is not present or solid due to the transparent casing and the transparent display unit. In addition, design can be improved.

In the imaging apparatus according to another aspect of the present invention, it is preferable that in the imaging apparatus, an area larger than or equal to half of a projection area of the imaging apparatus in the imaging direction of the imaging unit is transparent from an ocular side to an objective side due to the transparent casing and the transparent display unit. By making the area larger than or equal to half of the projection area of the imaging apparatus transparent, the range of the subject seen through the transparent casing and the display unit can be increased. In addition, a region in which the text is displayed can be sufficiently secured.

It is preferable that the imaging apparatus according to still another aspect of the present invention further comprises an image analysis unit that performs image analysis on the captured image acquired by the imaging unit, in which the text generation unit generates the text based on a result of the image analysis of the image analysis unit.

The text is generated based on the result of the image analysis of the captured image acquired by the imaging unit. Thus, appropriate text information representing the imaged scene, atmosphere, or the like can be provided to the user.

In the imaging apparatus according to still another aspect of the present invention, it is preferable that the display control unit displays an animation composed of the text generated by the text generation unit on the display unit. By displaying the text in the animation and changing the text display, design is improved.

In the imaging apparatus according to still another aspect of the present invention, it is preferable that the display control unit displays, on the display unit, an animation that is composed of the text generated by the text generation unit and in which the text moves from one end to the other end of the display screen of the display unit. Accordingly, the animation in which the text flows from one end to the other end of the display screen can be displayed. In addition, a generation time of the text can be perceived from a position at which the text is displayed on the display screen.

In the imaging apparatus according to still another aspect of the present invention, it is preferable that the display unit is arranged inside the casing. Accordingly, the transparent display unit can be protected by the transparent casing.

In the imaging apparatus according to still another aspect of the present invention, it is preferable that the display unit is formed of a plurality of display units that are parallelly arranged at intervals in the casing, and the display control unit displays the text generated by the text generation unit on each of the plurality of display units. Accordingly, the text can be displayed in a perspective manner.

In the imaging apparatus according to still another aspect of the present invention, it is preferable that the text generation unit decides at least one of a size, a shade, or a font of the generated text depending on the text. Accordingly, the visibility of the text can be highlighted, or variations of the text can be provided.

In the imaging apparatus according to still another aspect of the present invention, a finder frame that is centered at the imaging unit may be disposed in the casing, or the display control unit may display a finder frame centered at the imaging unit on the display unit. Accordingly, the apparatus main body is used as a finder, and the imaging range of the imaged subject can be checked using the finder frame. In addition, since the finder frame centered at the imaging unit is disposed, the center of the angle of view seen through the finder frame matches the center of the imaging range imaged by the imaging unit, and parallax does not occur.

In addition, a whole rectangular see-through region can be used as a finder. In this case, the rectangular see-through region corresponds to the finder frame. Furthermore, the text may not be displayed in the finder frame. In this case, it is possible that the text does not hinder decision of composition.

It is preferable that the imaging apparatus according to still another aspect of the present invention further comprises a print unit that prints the captured image acquired by the imaging unit and the text generated by the text generation unit in the casing.

The invention according to still another aspect is a text display method for an imaging apparatus including a transparent casing, an imaging unit that is arranged in the casing and acquires a captured image of a subject, and a transparent display unit that is arranged in the casing and includes a display screen orthogonal to an imaging direction of the imaging unit. The method comprises a step of collecting audio or an ambient sound by a sound collection unit, a step of generating a text based on the audio or the ambient sound, and a step of displaying the text on the display unit.

In the text display method according to still another aspect of the present invention, it is preferable that in the imaging apparatus, an area larger than or equal to half of a projection area of the imaging apparatus in the imaging direction of the imaging unit is transparent from an ocular side to an objective side due to the transparent casing and the transparent display unit.

It is preferable that the text display method according to still another aspect of the present invention further comprises a step of performing image analysis on the captured image acquired by the imaging unit, in which in the step of generating the text, the text is generated based on a result of the image analysis.

In the text display method according to still another aspect of the present invention, it is preferable that in the step of displaying the text on the display unit, an animation composed of the generated text is displayed on the display unit.

In the text display method according to still another aspect of the present invention, it is preferable that in the step of displaying the text on the display unit, an animation that is composed of the generated text and in which the text moves from one end to the other end of the display screen of the display unit is displayed on the display unit.

According to the present invention, a transparent casing and a transparent display unit are used as the casing and the display unit of the imaging apparatus. Thus, the text corresponding to the audio around the subject or the ambient sound can be displayed on the transparent apparatus main body (transparent display unit). Accordingly, without displaying a live view image, the text can be displayed in a superimposed manner on the subject that is seen through the transparent casing and the display unit. In addition, since only the text is displayed on the transparent display unit, the load of signal processing for display is decreased compared to a case where the live view image and the text are displayed in a superimposed manner, and a power consumption can also be decreased.

DESCRIPTION OF THE PREFERRED EMBODIMENTS

Hereinafter, an imaging apparatus and a text display method according to a preferred embodiment of the present invention will be described in accordance with the appended drawings.

[Exterior of First Embodiment of Imaging Apparatus]

Figure 1:
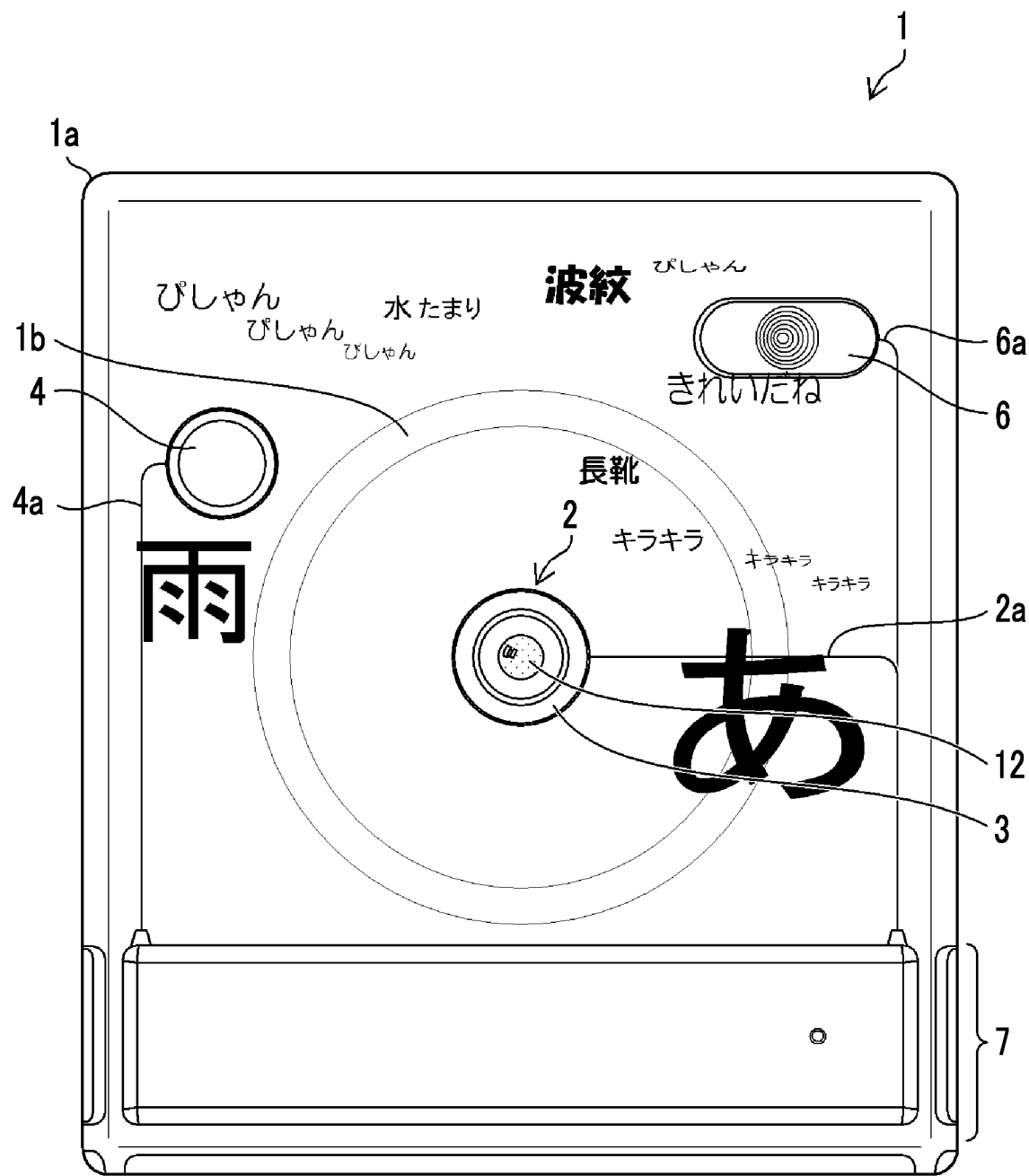
FIG. 1 is a front view illustrating a first embodiment of an imaging apparatus according to an embodiment of the present invention.
Figure 2:
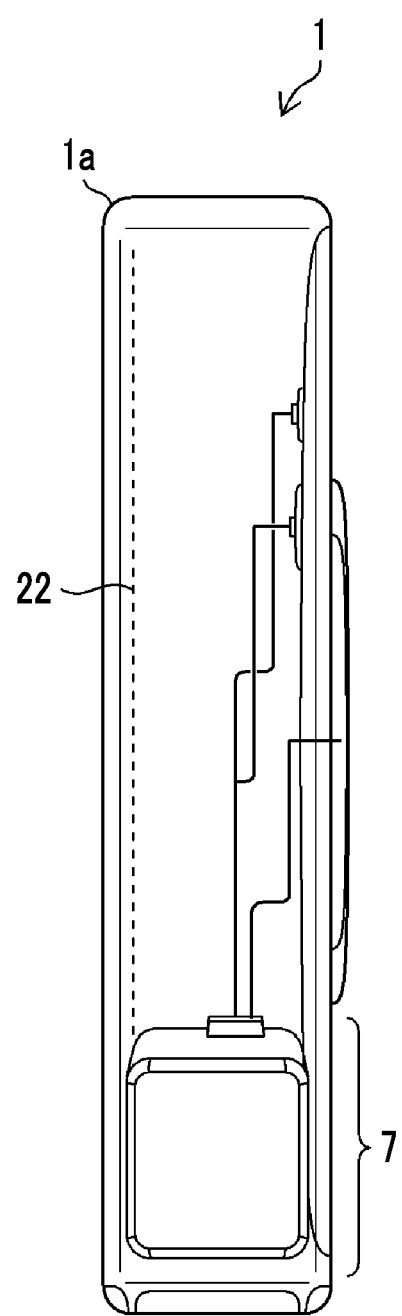
FIG. 2 is a left side view of the imaging apparatus illustrated in FIG. 1.

FIG. 1 and FIG. 2 are respectively a front view and a left side view illustrating a first embodiment of the imaging apparatus according to the embodiment of the present invention. FIG. 1 illustrates a case where a language (text language) representing a text is Japanese.

An imaging apparatus 1 illustrated in FIG. 1 and FIG. 2 is a digital camera that receives light passing through a lens by an imaging element, acquires image data of a still picture or a motion picture by converting the light into a digital signal, and records the acquired image data in a storage unit.

The imaging apparatus 1 is mainly formed of a transparent casing 1a, an imaging unit 2, a microphone 3, a transparent display unit 22, a shutter release switch 4, a flash light emission unit 6, a content 7, and the like.

For example, the transparent casing 1a is formed of a transparent acrylic resin. In the present example, the casing 1a has a rectangular parallelepiped shape in the same manner as the imaging apparatus 1 having a rectangular parallelepiped exterior. In addition, a cylindrical shape protruding portion 1b is integrated on the front surface of the casing 1a.

The imaging unit 2 includes an imaging lens, the imaging element, and drive units for the imaging lens and the imaging element. The imaging unit 2 corresponds to a small size imaging module that is used in a portable terminal such as a smartphone. It is preferable that the thickness of the imaging unit 2 approximately falls in the cylindrical shape protruding portion 1b of the casing 1a.

The microphone 3 functions as a sound collection unit that collects a sound (audio) emitted by a subject or a sound (including an ambient sound) around the subject. In the present example, the microphone 3 has a ring shape and is arranged around the imaging unit 2 having a circular shape.

The transparent display unit 22 includes a display screen (display screen parallel to the front surface or the rear surface of the imaging apparatus 1) that is orthogonal to the imaging direction of the imaging unit 2. As illustrated by a dotted line in FIG. 2, the display unit 22 is arranged inside the casing 1a. A transparent liquid crystal display, a transparent inorganic electro-luminescence (EL) display, a transparent organic EL display, or transparent electronic paper can be used as the transparent display unit 22. The display unit 22 can be an inexpensive display unit that can perform only a monochrome display, or may be a display unit that can perform a color display.

The shutter release switch 4 is formed of a so-called stroke type switch of two stages including "half push" and "full push". The shutter release switch 4 functions as an imaging preparation instruction unit and also functions as an imaging instruction unit for the image.

For example, the flash light emission unit 6 is a part that uses a xenon tube as a light emission source and emits flash light as auxiliary light in a case where the subject is dark.

The content 7 is a component group that is accommodated in the casing 1a and constitutes the imaging apparatus 1. The content 7 is formed of a component group other than the imaging unit 2, the microphone 3, the display unit 22, the shutter release switch 4, and the flash light emission unit 6. The content 7 is accommodated in the lower portion of the casing 1a.

In addition, the content 7, the imaging unit 2, and the microphone 3 are electrically connected to each other through a wire 2a. Similarly, the content 7, the shutter release switch 4, and the flash light emission unit 6 are electrically connected to each other through wires 4a and 6a. All or a part of the wires 2a, 4a, and 6a can be made transparent by using a transparent conductive material.

The casing 1a and the display unit 22 are transparent. Thus, the imaging apparatus 1 is transparent from an ocular side to an objective side except for a part in which the imaging unit 2, the microphone 3, the shutter release switch 4, the flash light emission unit 6, and the content 7 are accommodated. That is, the opposite side can be seen through the imaging apparatus 1. The term "transparent" refers to a certain degree of transparency in which the subject can be seen through the casing 1a and the display unit 22 (imaging apparatus main body).

It is preferable that the area of half or more of the projection area (area represented in FIG. 1) of the imaging apparatus 1 in the imaging direction of the imaging unit 2 is transparent from the ocular side to the objective side. The transparent area from the ocular side to the objective side in the projection area of the imaging apparatus 1 can be increased by disposing the shutter release switch 4 on the ceiling (upper surface) of the casing 1a and using a small white light emitting diode (LED) as a light source of the flash light emission unit 6.

[Exterior of Second Embodiment of Imaging Apparatus]

Figure 3:
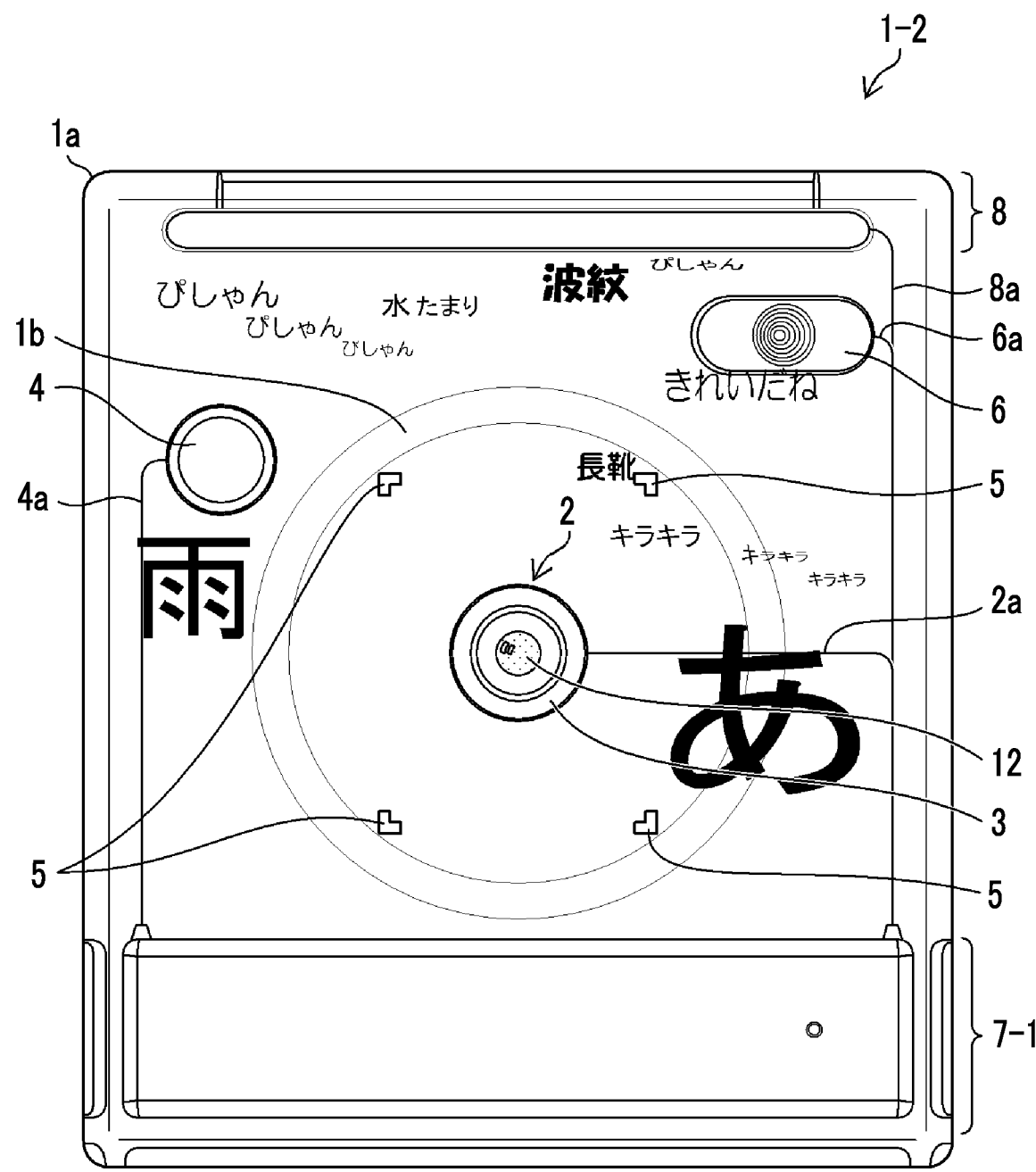
FIG. 3 is a front view illustrating a second embodiment of the imaging apparatus according to the embodiment of the present invention.
Figure 4:
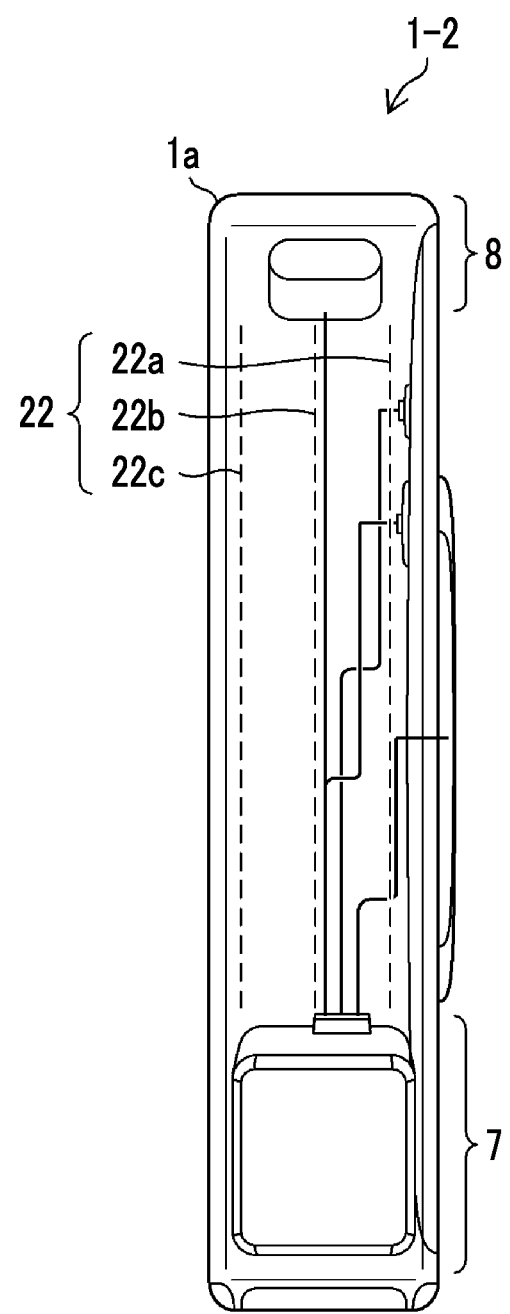
FIG. 4 is a left side view of the imaging apparatus illustrated in FIG. 3.
Figure 5:
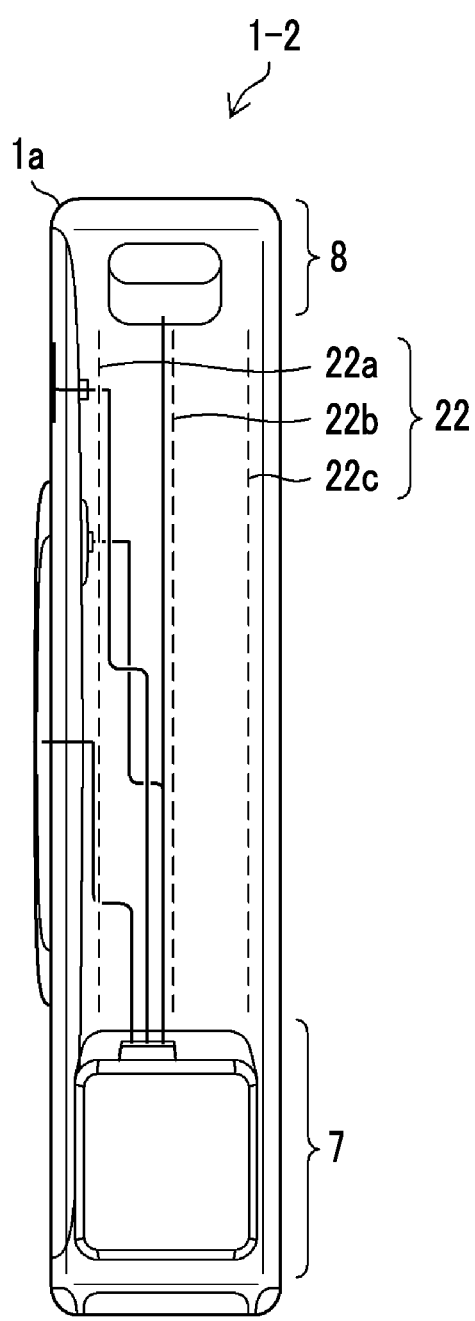
FIG. 5 is a right side view of the imaging apparatus illustrated in FIG. 3.
Figure 6:
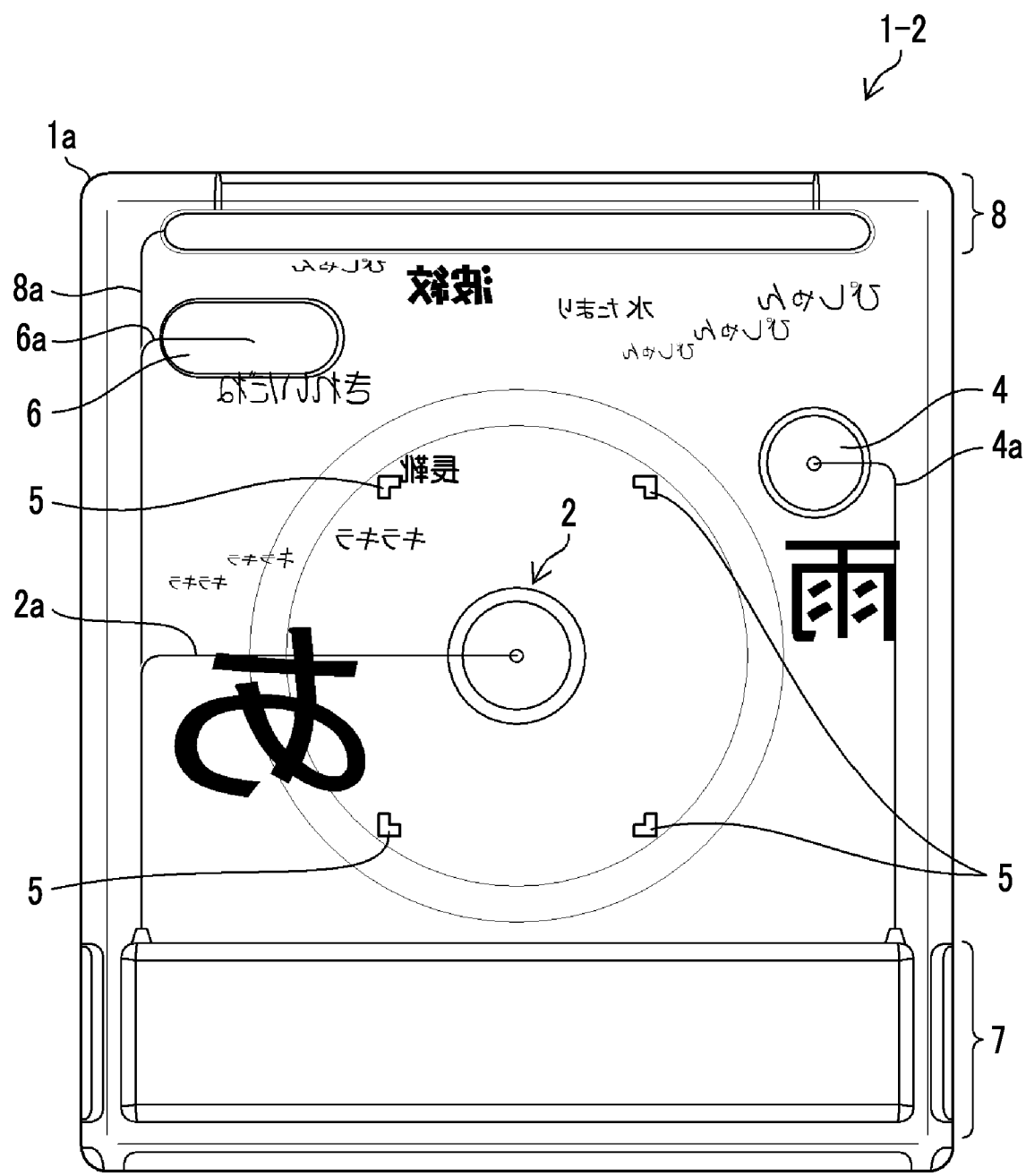
FIG. 6 is a rear view of the imaging apparatus illustrated in FIG. 3.

FIG. 3 to FIG. 6 are respectively a front view, a left side view, a right side view, and a rear view illustrating a second embodiment of the imaging apparatus according to the embodiment of the present invention. FIG. 3 and FIG. 6 illustrate a case where the text language is Japanese.

An imaging apparatus 1-2 illustrated in FIG. 3 to FIG. 6 is mainly different from the imaging apparatus 1 illustrated in FIG. 1 and FIG. 2 in that a printer is added. The imaging apparatus 1-2 is a printer-equipped imaging apparatus in which the digital camera that receives light passing through the lens by the imaging element, acquires the image data of the still picture or the motion picture by converting the light into the digital signal, and records the acquired image data in the storage unit is integrated with the printer that prints the image and the like on print paper based on the image data stored in the storage unit.

In the imaging apparatus 1-2 of the second embodiment illustrated in FIG. 3 to FIG. 6, parts common to the imaging apparatus 1 of the first embodiment illustrated in FIG. 1 and FIG. 2 will be designated by the same reference signs, and detailed descriptions of such parts will not be repeated.

Instead of the content 7, the imaging apparatus 1-2 of the second embodiment comprises a first content 7-1 and a second content 8 that function as a print unit.

The first content 7-1 and the second content 8 are component groups that are accommodated in the casing 1a and constitute the imaging apparatus 1-2. The first content 7-1 and the second content 8 are formed of component groups other than the imaging unit 2, the microphone 3, the display unit 22, the shutter release switch 4, and the flash light emission unit 6.

The first content 7-1 mainly includes a component group corresponding to the digital camera in the imaging apparatus 1-2 and is accommodated in the lower portion of the casing 1a in FIG. 3. The second content 8 mainly includes a component group corresponding to the print unit (printer) and is accommodated in the upper portion of the casing 1a. Details of the first content 7-1 and the second content 8 will be described below.

In addition, the first content 7-1, the imaging unit 2, and the microphone 3 are electrically connected to each other through the wire 2a. Similarly, the first content 7-1, the shutter release switch 4, the flash light emission unit 6, and the second content 8 are electrically connected to each other through wires 4a, 6a, and 8a. All or a part of the wires 2a, 4a, 6a, and 8a can be made transparent by using a transparent conductive material.

The transparent display unit 22 is formed of a plurality (three) of display units 22a, 22b, and 22c that are parallelly arranged at intervals in the casing 1a as illustrated by dotted lines in FIG. 4 and FIG. 5.

The casing 1a and the display unit 22 are transparent. Thus, the imaging apparatus 1-2 is transparent from the ocular side to the objective side except for a part in which the imaging unit 2, the microphone 3, the shutter release switch 4, the flash light emission unit 6, the first content 7-1, and the second content 8 are accommodated.

It is preferable that the area of half or more of the projection area (area represented in FIG. 3) of the imaging apparatus 1-2 in the imaging direction of the imaging unit 2 is transparent from the ocular side to the objective side. In addition, it is preferable that a content is not accommodated in the center part of the casing 1a except for the imaging unit 2. In the present example, the first content 7-1 and the second content 8 are accommodated in the lower portion and the upper portion of the casing 1a, respectively.

A finder frame 5 centered at the imaging unit 2 is disposed by printing, carving, or the like in the transparent casing 1a. It is preferable that based on the distance between the imaging apparatus 1-2 and a face and the focal length of the imaging lens at the time of orienting the imaging apparatus 1-2 for deciding the composition, the size of the finder frame 5 is decided such that a range seen through the finder frame 5 is an imaged range.

According to the finder frame 5, the imaging unit 2 is positioned at the center of the finder frame 5. Thus, the center of the field of view seen through the finder frame 5 matches the center of the imaging range imaged by the imaging unit 2, and parallax does not occur.

The finder frame 5 of the present example is formed of markers disposed at the four corners of a rectangle indicating the imaging range. However, the shape of the finder frame is not limited to this embodiment. Various shapes can be applied.

While illustration is not provided in FIG. 3 to FIG. 6, a guide unit that guides the print paper during transport of the print paper from the first content 7-1 to the second content 8 is disposed in the casing 1a. The guide unit can be configured as a gap corresponding to the width and the thickness of the print paper. A guide roller or the like may be further arranged.

[Schematic Internal Configuration of Imaging Apparatus]

Figure 7:
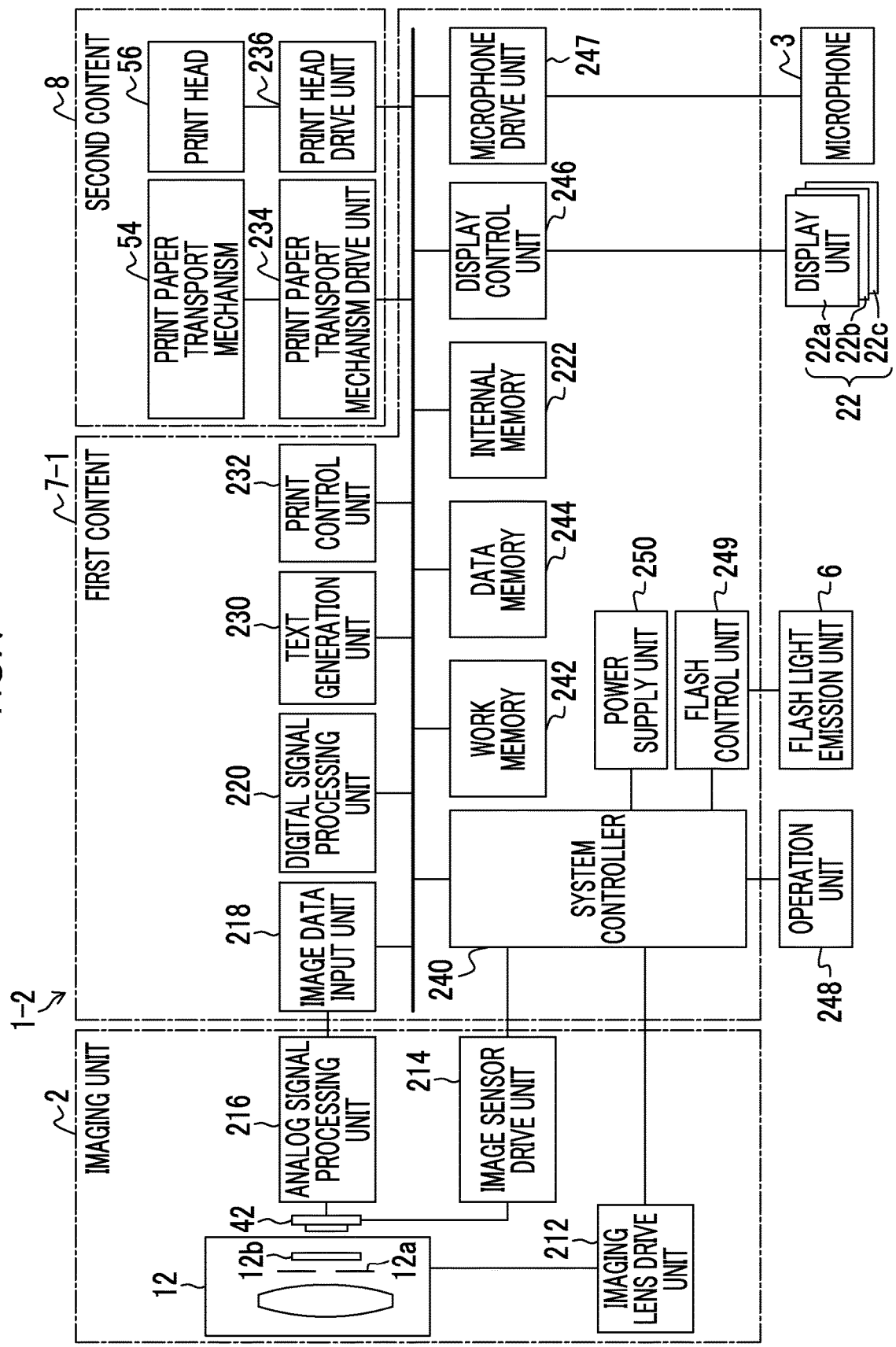
FIG. 7 is a block diagram illustrating a schematic configuration of the imaging apparatus illustrated in FIG. 3.

FIG. 7 is a block diagram illustrating a schematic internal configuration of the imaging apparatus 1-2 of the second embodiment illustrated in FIG. 3 to FIG. 6. The schematic interior configuration of the imaging apparatus 1 of the first embodiment illustrated in FIG. 1 and FIG. 2 is mainly different from the imaging apparatus 1-2 of the second embodiment in that the print unit is not comprised. However, other configurations are common. Thus, detailed descriptions of such configurations will not be repeated.

As described above, the imaging apparatus 1-2 is configured to comprise the imaging unit 2, the microphone 3, an operation unit 248 including the shutter release switch 4, the flash light emission unit 6, the first content 7-1, and the second content 8.

<Imaging Unit>

The imaging unit 2 is formed of the imaging lens 12, an imaging lens drive unit 212, an image sensor 42, an image sensor drive unit 214, and an analog signal processing unit 216.

The imaging lens 12 is composed of a plurality of lenses including a focus lens. In FIG. 7, only one lens is illustrated for simplification. The focal point of the imaging lens 12 is adjusted by moving the focus lens forward and rearward along an optical axis by the imaging lens drive unit 212.

A stop 12a and a shutter 12b are comprised in the imaging lens 12. The intensity of light passing through the imaging lens 12 is adjusted by the stop 12a. Light passing through the imaging lens 12 is blocked by the shutter 12b.

The image sensor 42 is formed of a two-dimensional solid-state imaging element such as a charge coupled device (CCD) image sensor or a complementary metal oxide semiconductor (CMOS) image sensor.

The imaging lens drive unit 212 is drive means for the imaging lens 12. The imaging lens drive unit 212 drives the focus lens, the stop 12a, and the shutter 12b. The imaging lens drive unit 212 drives the imaging lens 12 under control of a system controller 240.

The image sensor drive unit 214 is drive means for the image sensor 42. The image sensor drive unit 214 drives the image sensor 42 and controls reading out of an image signal from the image sensor 42 under control of the system controller 240. In addition, the image sensor drive unit 214 has an electronic shutter function of starting exposure by simultaneously discharging (resetting at the same time) electric charges accumulated in each pixel of the image sensor 42 based on an electronic shutter control signal from the system controller 240.

The analog signal processing unit 216 performs various analog signal processing on an analog image signal obtained by imaging the subject by the image sensor 42. The analog signal processing unit 216 is configured to include a sampling hold circuit, a color separation circuit, an automatic gain control (AGC) circuit, an analog/digital (A/D) converter, and the like. The AGC circuit functions as a sensitivity adjustment unit that adjusts sensitivity (International Organization for Standardization (ISO) sensitivity) at the time of imaging. The AGC circuit adjusts the gain of an amplifier amplifying the input image signal and sets the signal level of the image signal to fall in an appropriate range.

The A/D converter converts the analog image signal into a digital image signal. In a case where the image sensor 42 is a CMOS type image sensor, the analog signal processing unit 216 including the A/D converter is mostly incorporated in the CMOS type image sensor.

<First Content>

The first content 7-1 includes an image data input unit 218, a digital signal processing unit 220, an internal memory 222, a text generation unit 230, a print control unit 232, the system controller 240, a work memory 242, a data memory 244, a display control unit 246, a microphone drive unit 247, a flash control unit 249, and a power supply unit 250.

The image data input unit 218 acquires the digital image signal output from the analog signal processing unit 216 under control of the system controller 240. The acquired image data corresponding to one sheet is stored in the work memory 242.

The system controller 240 is a control unit that controls the whole imaging apparatus 1-2. The system controller 240 is formed of a computer and provides various functions by executing a predetermined program.

In the imaging apparatus 1-2 of the second embodiment, the system controller 240 has a function as an image analysis unit. Furthermore, the system controller 240 may have functions as the text generation unit 230, the print control unit 232, and the display control unit 246.

The digital signal processing unit 220 performs necessary signal processing such as a demosaicing process, white balance correction, gamma correction, and contour correction on the image data acquired in the work memory 242 and generates predetermined image data that includes brightness data (Y data) and color difference data (Cr and Cb data).

The internal memory 222 is one example of an image storage unit. The image obtained by imaging is recorded in the internal memory 222. The internal memory 222 is formed of a non-volatile memory such as an electrically erasable programmable read only memory (EEPROM).

The text generation unit 230 is a part that converts a sound into a text based on the sound (audio) that is emitted from the subject or the like and is acquired through the microphone 3 and the microphone drive unit 247 (sound collection unit), and sound data that indicates the sound (ambient sound) around the subject. It is preferable that the audio is converted into a text corresponding to the language of the audio. The ambient sound is mainly converted into an animate phonomime.

In addition, the text generation unit 230 generates a text based on the result of image analysis in the image analysis unit that performs the image analysis on the captured image acquired by the imaging unit 2. For example, the image analysis unit extracts an object in the captured image, and the text generation unit 230 generates a text indicating the extracted object. In addition, the image analysis unit analyzes a scene (scene determination) from the captured image (including the motion picture), and the text generation unit 230 generates a text (animate phonomime) indicating the scene subjected to the scene determination.

Furthermore, it is preferable that the system controller 240 has a function as a language selection unit (not illustrated). For example, in a case where the text generation unit 230 generates the text based on the sound data, the language selection unit may select the language (text language) representing the text by automatically determining the language (audio language) of the sound data. In addition, for example, the language selection unit may display a language selection menu including a plurality of languages (for example, Japanese, English, Spanish, Portuguese, French. and German) on the display unit 22 by operating a menu button included in the operation unit 248 by a user, and select the text language based on an operation of selecting a desired language by the user. In this case, the text generation unit 230 generates the text based on the sound data and the text based on the result of the image analysis using the language selected by the language selection unit.

The print control unit 232 generates print image data based on the captured image to be printed by the print unit and print image data based on the text generated by the text generation unit 230, outputs the generated print image data to the print unit, and causes the print unit to print a combined photograph in which the image and the text are combined. Details of printing of the combined photograph will be described below.

The work memory 242 is a memory for work. For example, the work memory 242 is formed of a synchronous dynamic random access memory (SDRAM). The data memory 244 is a memory that stores a control program, various data necessary for control, and the like. The data memory 244 is formed of a non-volatile memory such as an EEPROM.

The display control unit 246 is a part that generates display data for displaying the text on the display unit 22 (22a, 22b, and 22c) based on the text generated by the text generation unit 230. Particularly, the display control unit 246 generates the display data indicating an animation (animation in which the text moves) composed of the text. For example, the display data indicating an animation in which the text generated by the text generation unit 230 moves from one end to the other end of the display screen of the display unit 22 is generated.

By outputting the display data indicating the animation to the display unit 22, the animation in which the text flows can be displayed on the display unit 22.

The display control unit 246 of the present example displays the text generated by the text generation unit 230 on the display unit 22. It is further preferable that the print unit can display the print image to be output as a print on the display unit 22 such that the print image can be checked in advance.

In the present example, the finder frame 5 is disposed in the transparent casing 1a. Alternatively, the display control unit 246 may display the same finder frame as the finder frame 5 on the display unit 22.

The microphone drive unit 247 amplifies the audio signal indicating the audio or the ambient sound collected by the microphone 3, converts the audio signal into a digital signal, and transmits the digital signal to the text generation unit 230.

For example, the flash control unit 249 performs flash control based on a through the lens (TTL) automatic light adjustment method. Thus, the flash control unit 249 has a function of adjusting the emission intensity (guide number) of flash light emitted from the flash light emission unit 6. That is, the flash control unit 249 causes the flash light emission unit 6 to emit light in synchronization with a flash imaging instruction from the system controller 240 and starts measuring reflected light (including ambient light) that is incident through the imaging lens 12. In a case where a light measurement value reaches a reference exposure value, the flash control unit 249 stops the emission of flash light from the flash light emission unit 6.

The power supply unit 250 supplies power to each unit under control of the system controller 240. The power supply unit 250 comprises a battery as a power supply and a power supply circuit.

The operation unit 248 includes the shutter release switch 4. Besides, the operation unit 248 may include a menu button, a command dial, a multifunction cross key, a power button, and the like. In addition, the operation unit 248 may be formed of a transparent touch panel arranged on the rear surface of the casing 1a, and the display unit 22 displaying icons indicating various switches.

<Second Content>

The second content 8 is a part mainly corresponding to the print unit (printer) in the imaging apparatus 1-2. The second content 8 includes a print paper transport mechanism 54, a print head 56, a print paper transport mechanism drive unit 234, and a print head drive unit 236.

For example, the print unit of the present example is a TA printer that employs a thermo autochrome (TA) method as a printing method. The print unit colorizes TA paper (hereinafter, referred to as "print paper") having colorizing layers of cyan (C), magenta (M), and yellow (Y) using heat and fixes the colorization by irradiation of light having a predetermined wavelength. The print unit includes the print paper transport mechanism 54 and the print paper transport mechanism drive unit 234 that transport the print paper, the print head 56 that functions as a thermal head, the print head drive unit 236, a fixing lamp, and the like.

In a case where a color captured image is printed on the print paper, the print control unit 232 generates signals (a C signal, an M signal, and a Y signal) of C, M, and Y that are complementary colors of three primary colors as the print image data based on the captured image. The print control unit 232 transports the print paper, controls the print head 56 based on the Y signal, colorizes the yellow layer of the print paper, and then, fixes the colorization of yellow by the fixing lamp. Colorization of the magenta layer and the cyan layer of the print paper is performed in the same manner based on the M signal and the C signal. Accordingly, the color captured image is printed on the print paper.

The print paper is a long print medium that is wound in a roll shape and accommodated in a cartridge, not illustrated. The cartridge is accommodated in the casing 1a as a part of the first content 7-1.

The first content 7-1 includes a print paper dispensing mechanism, not illustrated, that rotates the shaft of the cartridge and dispenses the print paper from the cartridge. In a case where the tip end of the print paper dispensed from the cartridge reaches the print paper transport mechanism 54 (for example, between a capstan roller and a pinch roller), the print paper is transported by the print paper transport mechanism 54, and the captured image and the text are printed on the print paper by the print head 56. Accordingly, a long photo print of the combined photograph in which the image and the text are combined is obtained from a discharge port disposed on the ceiling (upper surface) of the casing 1a.

While the print unit of the imaging apparatus 1-2 is a TA printer, the print unit is not for limitation purposes. The print unit may be a printer of other types such as a thermal printer and an ink jet printer.

[Text Display Method]

<First Embodiment of Text Display Method>

Figure 8:
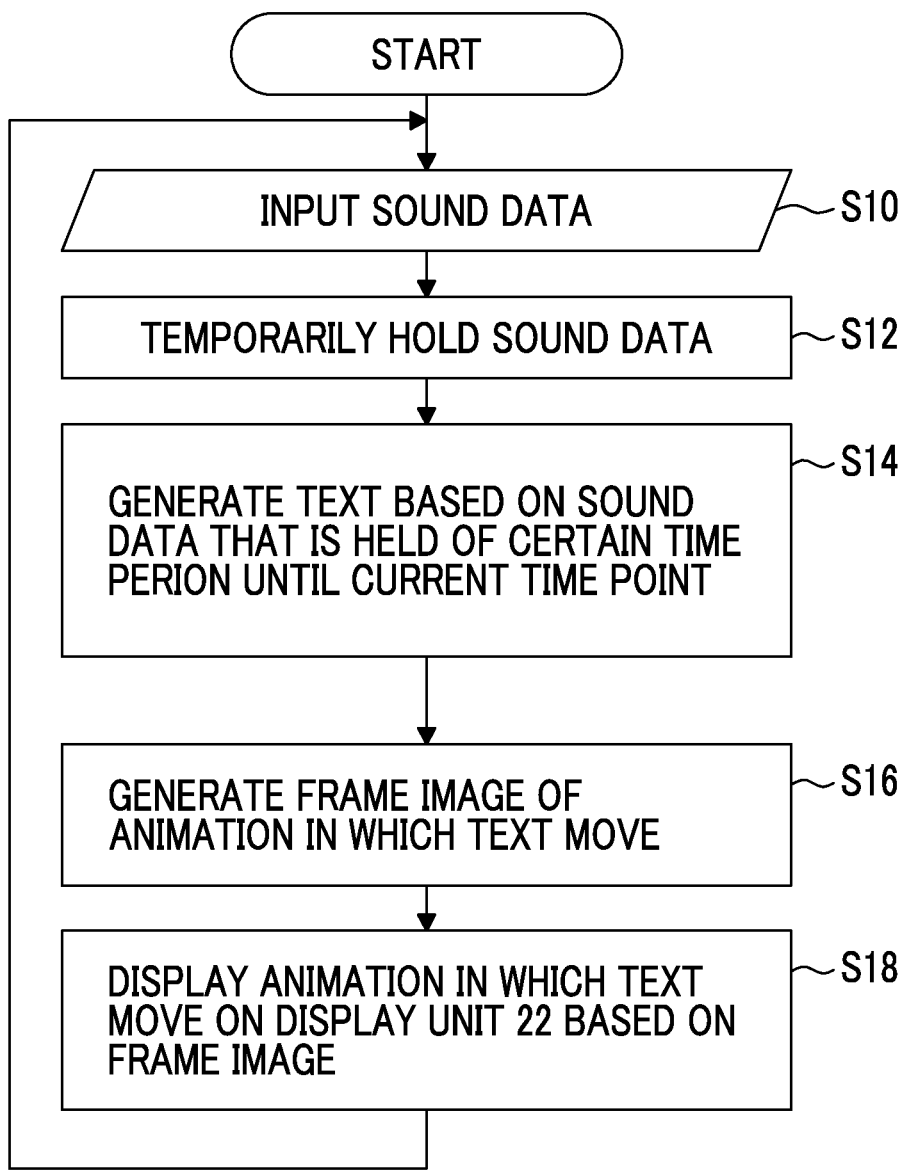
FIG. 8 is a flowchart illustrating a first embodiment of a text display method according to the embodiment of the present invention.

FIG. 8 is a flowchart illustrating a first embodiment of the text display method according to the embodiment of the present invention.

The text display method illustrated in FIG. 8 shows a method of displaying the text on the display unit 22 by the imaging apparatus of the first embodiment or the second embodiment and shows a case where the text is displayed on the display unit 22 when the imaging apparatus is in a typical operation state (for example, an imaging standby state).

In FIG. 8, the sound data that indicates the sound (audio) emitted from the subject or the like and the sound around the subject (ambient sound) collected through the microphone 3 is input into the text generation unit 230 (step S10). The text generation unit 230 temporarily holds the input sound data (step S12). The sound data may be held in a memory inside the text generation unit 230 or may be held in the work memory 242.

The text generation unit 230 generates the text based on the sound data that is held for a period of a certain time period until the current time point (step S14). For example, in a case where the sound data that indicates audio emitted by the subject or the imaging person who is a person is input, the sound data is converted into a text representing an audio language. In a case where the sound data indicating the ambient sound is input, the sound data is converted into a text representing an animate phonomime corresponding to the ambient sound. In addition, it is preferable that the text generation unit 230 decides at least one of the size, the shade, or the font of the text depending on the text. For example, the size and/or the shade of the text can be changed depending on the number of texts of a series of texts. The font of the text can be changed depending on the text showing the audio language, the text showing the animate phonomime, or a type such as kanji, hiragana, or katakana in a case where the text language is Japanese.

The display control unit 246 generates display data for displaying the text on the display unit 22 based on the text generated in step S14. In the present example, a frame image of an animation (animation in which the text moves) that is composed of the text is generated (step S16). For example, the frame image constituting the animation can be generated by deciding the position of the text arranged in the frame depending on the input time (time that indicates a change within the certain time period until the current time point) of the sound data corresponding to the text.

The display control unit 246 outputs the generated frame image to the display unit 22 and displays the animation in which the text moves on the display unit 22 based on the frame image (step S18).

For example, the processes of step S10 to step S18 are repeatedly executed in a cycle corresponding to the frame rate of the animation.

Figure 9:
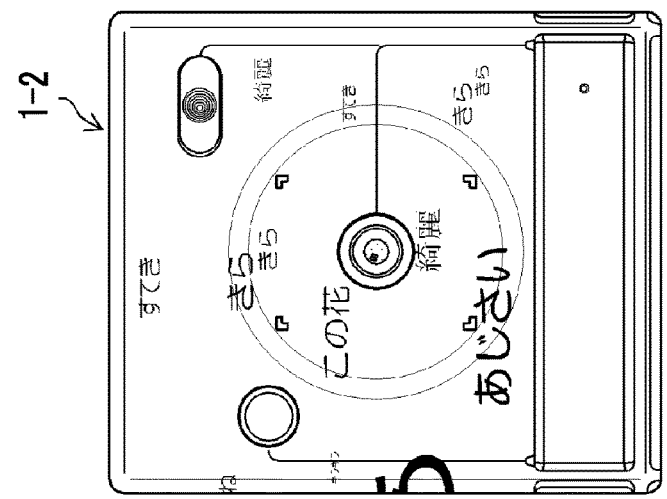
FIG. 9 is a diagram illustrating a state where a text displayed on a display screen of a display unit of the imaging apparatus of the second embodiment moves.
Figure 9:
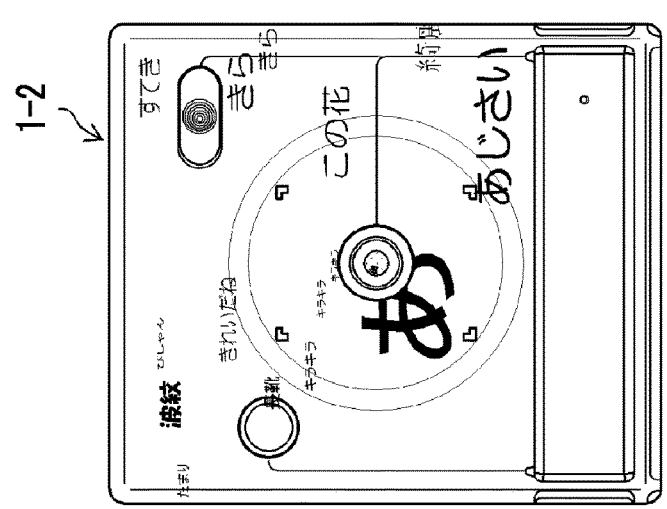
Figure 9:
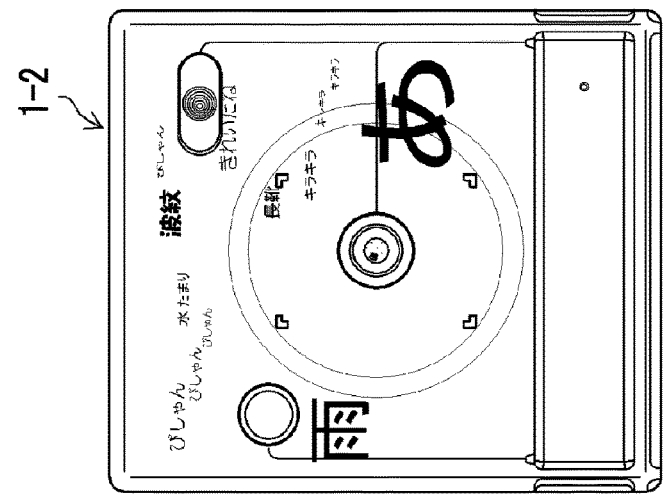

FIG. 9 is a front view of the imaging apparatus 1-2 of the second embodiment illustrating a state where the text moves. FIG. 9 illustrates a case where the text language is Japanese.

In the example illustrated in FIG. 9, an animation in which the text moves from one end (right end) to the other end (left end) of the display screen of the display unit.

That is, the text generated based on the most recent sound data is displayed at the right end of the display screen. Then, the text is displayed such that the text moves to the left side along with an elapse of time and is removed from the left end of the display screen after an elapse of a certain time period. Accordingly, the text generated based on the most recent sound data is displayed on the display unit for the "certain time period". It is preferable that the "certain time period"

is a time period appropriate for a speed at which the text is read. The movement speed of the text is decided by the size of the display screen of the display unit and the "certain time period".

According to the text display method of the first embodiment, the text indicating the sound collected by the microphone 3 can be displayed on the transparent display unit 22 disposed in the transparent casing 1a (that is, the text can be seen as floating in the air). In addition, the imaging range can be visually recognized by the finder frame 5 (FIG. 6) disposed in the transparent casing 1a without displaying the live view image on the display unit 22. The text can be seen as floating within the field of view including at least the imaging range.

In addition, as illustrated in FIG. 4, FIG. 5, and FIG. 7, the display unit 22 of the imaging apparatus 1-2 is formed of the three display units 22a. 22b, and 22c that are parallelly arranged at intervals in the casing 1a. Thus, the text displayed on the display units 22a. 22b, and 22c can be visually recognized in a perspective manner.

In the present embodiment, the animation (animation in which the text flows) composed of the text is displayed such that the text moves from the right end to the left end of the display screen in a case where the imaging apparatus 1-2 is seen from the front surface of the imaging apparatus 1-2. However, the animation is not for limitation purposes. For example, an animation in which the text flows from the left end to the right end of the display screen, an animation in which the text flows from the upper end to the lower end of the display screen, and an animation in which the text flows from the lower end to the upper end of the display screen may be used. In addition, an animation in which two or more animations of the four animations are combined may be used. Furthermore, an animation in which the text is displayed for a certain time period by fading in and fading out the text without moving the text may be used.

<Second Embodiment of Text Display Method>

Figure 10:
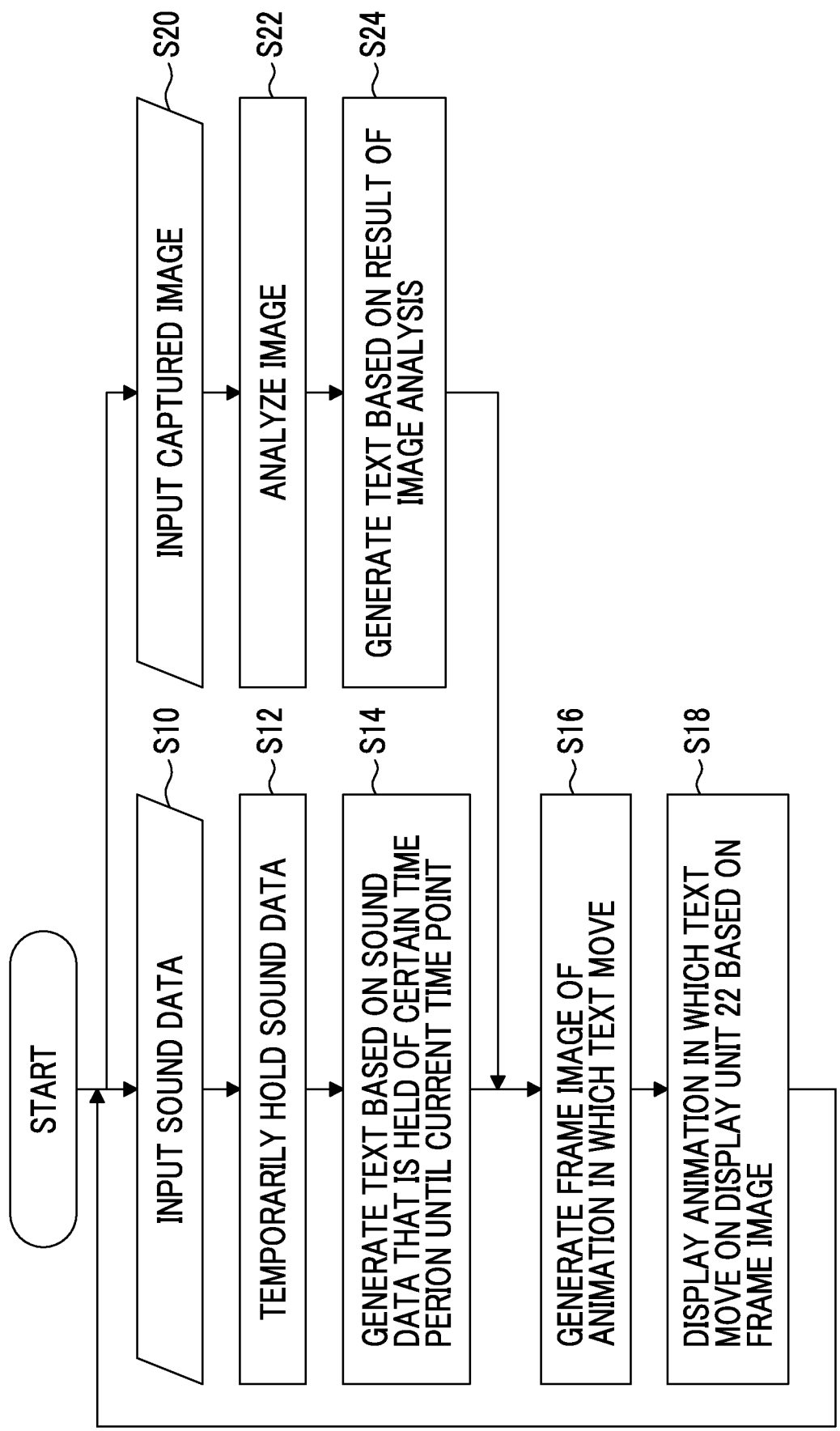
FIG. 10 is a flowchart illustrating a second embodiment of the text display method according to the embodiment of the present invention.

FIG. 10 is a flowchart illustrating a second embodiment of the text display method according to the embodiment of the present invention. In FIG. 10, common parts in the first embodiment illustrated in FIG. 8 will be designated by the same step numbers, and detailed description of such steps will not be repeated.

The text display method of the second embodiment illustrated in FIG. 10 is different from the first embodiment in that a display form of generating the text from the captured image and displaying the text is added in addition to the generation and display of the text from the sound data.

That is, in the text display method of the second embodiment illustrated in FIG. 10, steps S20, S22, and S24 are added in addition to step S10 to step S18 of the first embodiment.

The captured image acquired by the imaging unit 2 is input into an image analysis unit that is incorporated in the text generation unit 230, or an image analysis unit (for example, the image analysis unit disposed as one function of the system controller 240) that is disposed separately from the text generation unit 230 (step S20). It is preferable that the captured image input in step S20 is an image that is consecutively captured at a predetermined time interval (for example, a time interval equivalent to one frame of the live view image or the motion picture or a time interval shorter than the certain time period in which the text is displayed on the display unit 22).

The image analysis unit analyses the captured image input in step S20 and extracts an object (a rose, an umbrella, a manhole, a landmark, or the like) in the captured image or extracts a text in the captured image (step S22). In addition, the image analysis unit analyzes a scene (scene such as a state where the subject jumps, strong wind, sea spray, or ripples) from the consecutively input captured images (scene determination).

The text generation unit 230 generates a text indicating the extracted object and a text (including an animate phonomime) indicating the scene subjected to the scene determination based on the result of the image analysis in step S22 (step S24).

In step S16, the frame image of the animation in which the texts is moved is generated based on the text generated from the sound data and the text acquired by analyzing the captured image. In a case where the animation in which the text moves is displayed on each of the three display units 22a. 22b, and 22c, it is preferable to create three animations. In addition, the animation in which the text generated from the sound data is moved, and the animation in which the text acquired by analyzing the captured image is moved can be generated as separate animations.

The display control unit 246 outputs the generated frame image to the display unit 22 (22a, 22b, and 22c) and displays the animation in which the text moves on the display unit 22 based on the frame image (step S18).

According to the text display method of the second embodiment, the text indicating the sound collected by the microphone 3 and the text acquired from the captured image can be displayed on the transparent display unit 22 disposed in the transparent casing 1a (that is, the text can be seen as floating and moving in the air). In addition, the imaging range can be visually recognized by the finder frame 5 (FIG. 6) disposed in the transparent casing 1a without displaying the live view image on the display unit 22. The text can be seen as floating within the field of view including at least the imaging range.

[Effect of Imaging Apparatus]

Figure 11:
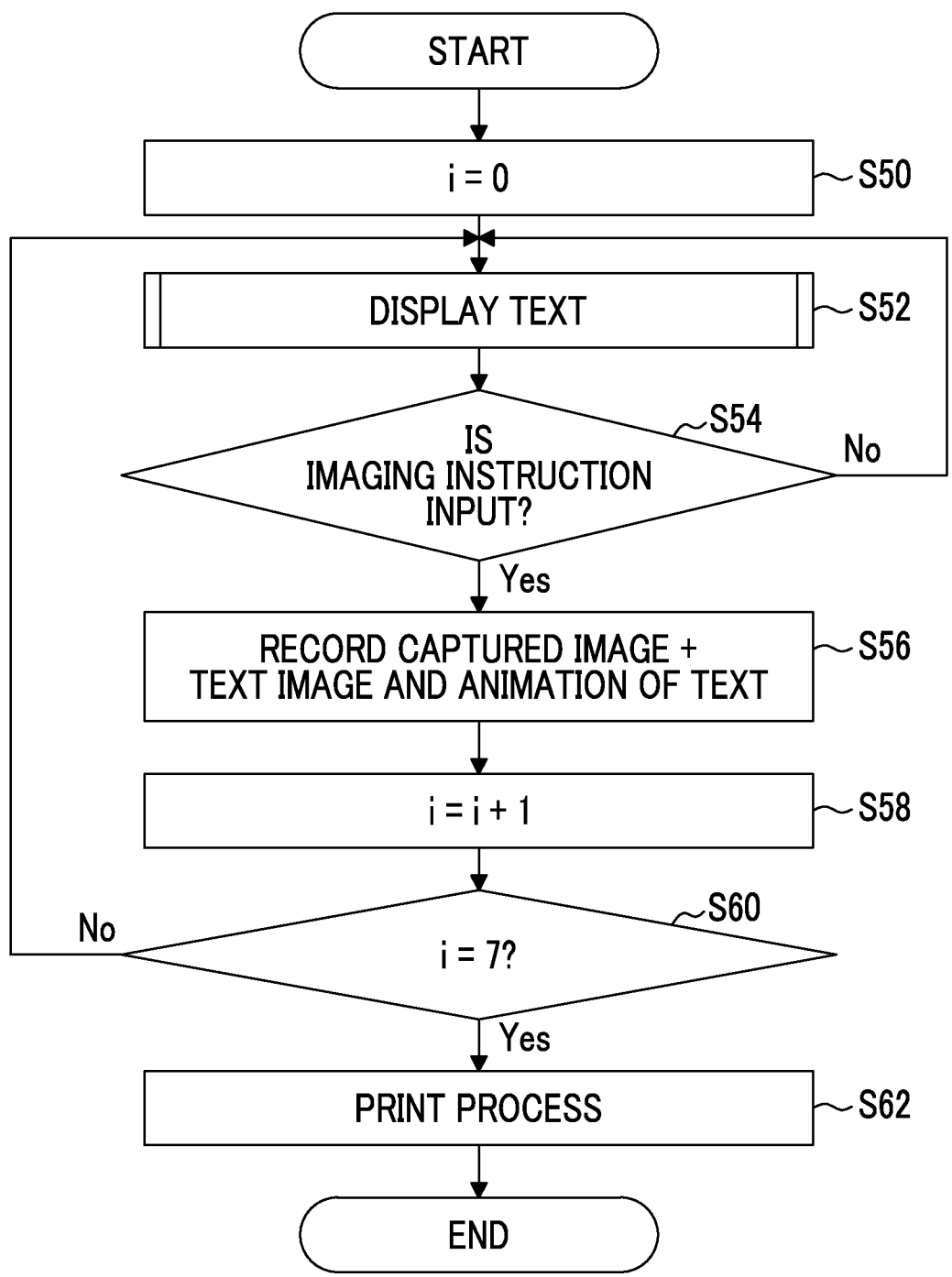
FIG. 11 is a flowchart illustrating an effect of the imaging apparatus of the second embodiment.

FIG. 11 is a flowchart illustrating an effect of the imaging apparatus 1-2 of the second embodiment.

The imaging apparatus 1-2 of the second embodiment is a printer-equipped imaging apparatus that acquires a plurality of sets (in the present example, seven sets) of images and acquires a photo print of a long combined photograph in which the acquired seven sets of images are consecutively arranged. One set of images includes the captured image and a text image corresponding to the captured image.

In FIG. 11, in a case where the cartridge in which the print paper is wound is newly accommodated in the casing 1a as a part of the first content 7-1, the system controller 240 sets a parameter i indicating the number of imaging sheets to zero (i=0) (step S50).

Then, the animation in which the text generated from the sound data collected by the microphone 3 and the text acquired by analyzing the captured image captured by the imaging unit 2 flow on the display screen of the display unit 22 is displayed (step S52). The text display method in step S52 is described in detail using FIG. 8 to FIG. 10. Thus, a description of step S52 will not be repeated.

Next, the system controller 240 determines whether or not an imaging instruction is input by operating the shutter release switch 4 (step S54). In a case where the imaging instruction is input (in the case of "Yes"), the system controller 240 transitions to step S56. In a case where the imaging instruction is not input (in the case of "No"), the system controller 240 transitions to step S52 and continues the text display.

In a case where the imaging instruction is input, the system controller 240 causes the imaging unit 2 to image the still picture, acquires the captured image, generates the text image based on the text that is generated by the text generation unit 230 before the imaging or in a certain time period before or after the imaging, and records the captured image and the text image in the internal memory 222 in association with each other (step S56). It is preferable that motion picture data that indicates the animation of the text displayed on the display unit 22 before the imaging or in the certain time period before or after the imaging is also recorded.

It is preferable that the text image is generated by assigning a priority to a plurality of texts (texts indicating a single word, a phrase, a short sentence, and an animate phonomime) generated by the text generation unit 230 before the imaging or in the certain time period before or after the imaging, extracting a predetermined number of texts or less in descending order of priority, and appropriately arranging the extracted texts. The priority of the text can be decided depending on the scene or the atmosphere of the captured image or the degree of matching between the seven captured images and storytelling. In addition, it is preferable that the text image is generated by deciding the size, the shade, and the font of the text depending on the text.

Next, the system controller 240 increments the parameter i indicating the number of imaging sheets by one (step S58) and determines whether or not the parameter i incremented by one is equal to 7 (i=7) (step S60).

In a case where i=7 is not satisfied (in the case of "No"), the predetermined number of imaging sheets (seven) is not reached. Thus, the system controller 240 returns to step S52. In a case where i=7 is satisfied (in the case of "Yes"), the predetermined number of imaging sheets is reached. Thus, the system controller 240 transitions to step S62 and executes a print process (step S62).

The print control unit 232 generates the print image data of the seven sets based on the captured images and the text images of the seven sets recorded in step S56 and outputs the generated print image data of the seven sets to the print unit. Accordingly, by using the captured image and the text image corresponding to the captured image as one set of images, the combined photograph in which the seven sets of images are consecutively arranged is printed (step S62).

Figure 13:
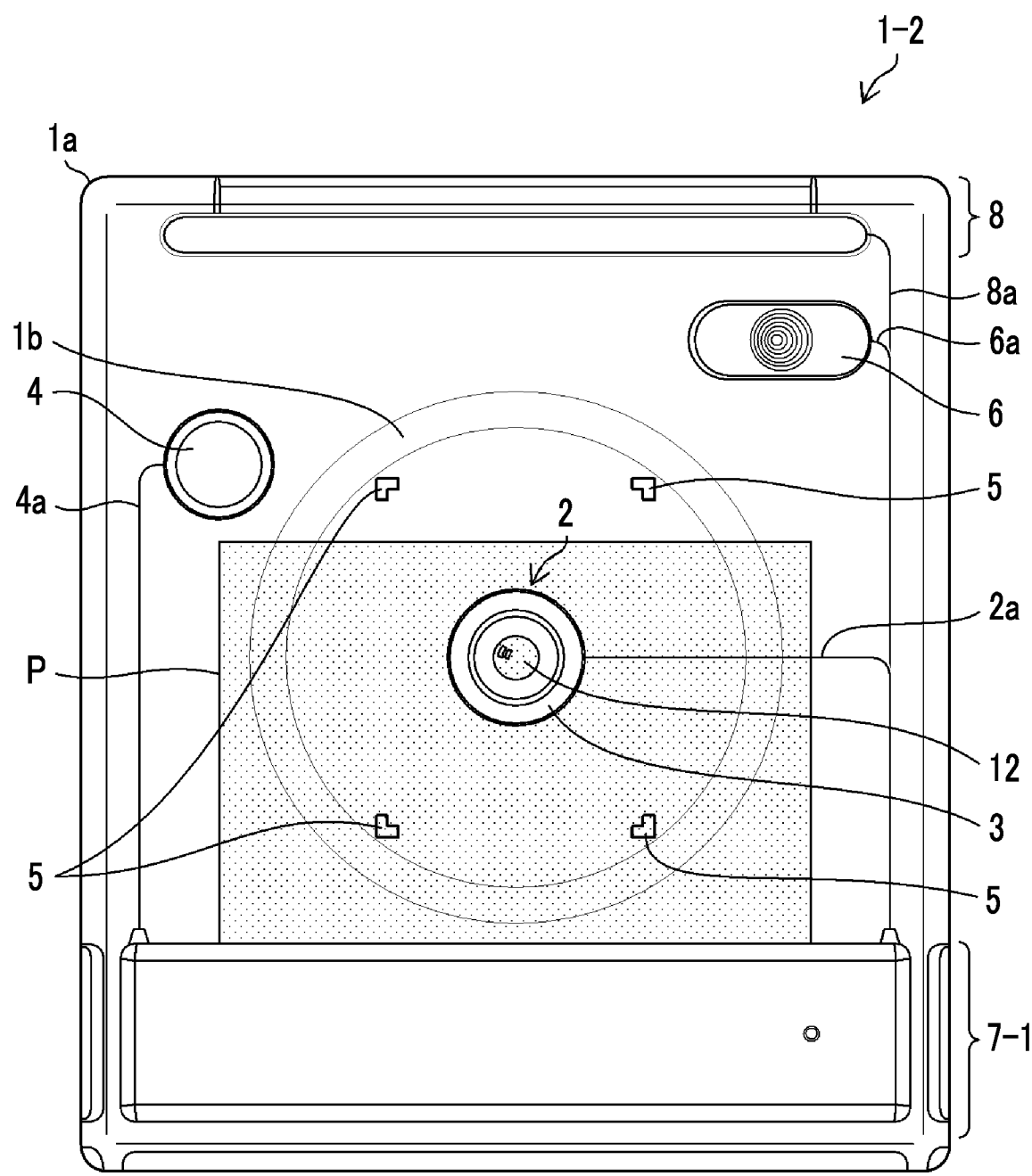
FIG. 13 is another diagram illustrating a state where the print paper is dispensed from the lower portion to the upper portion of the imaging apparatus of the second embodiment.
Figure 14:
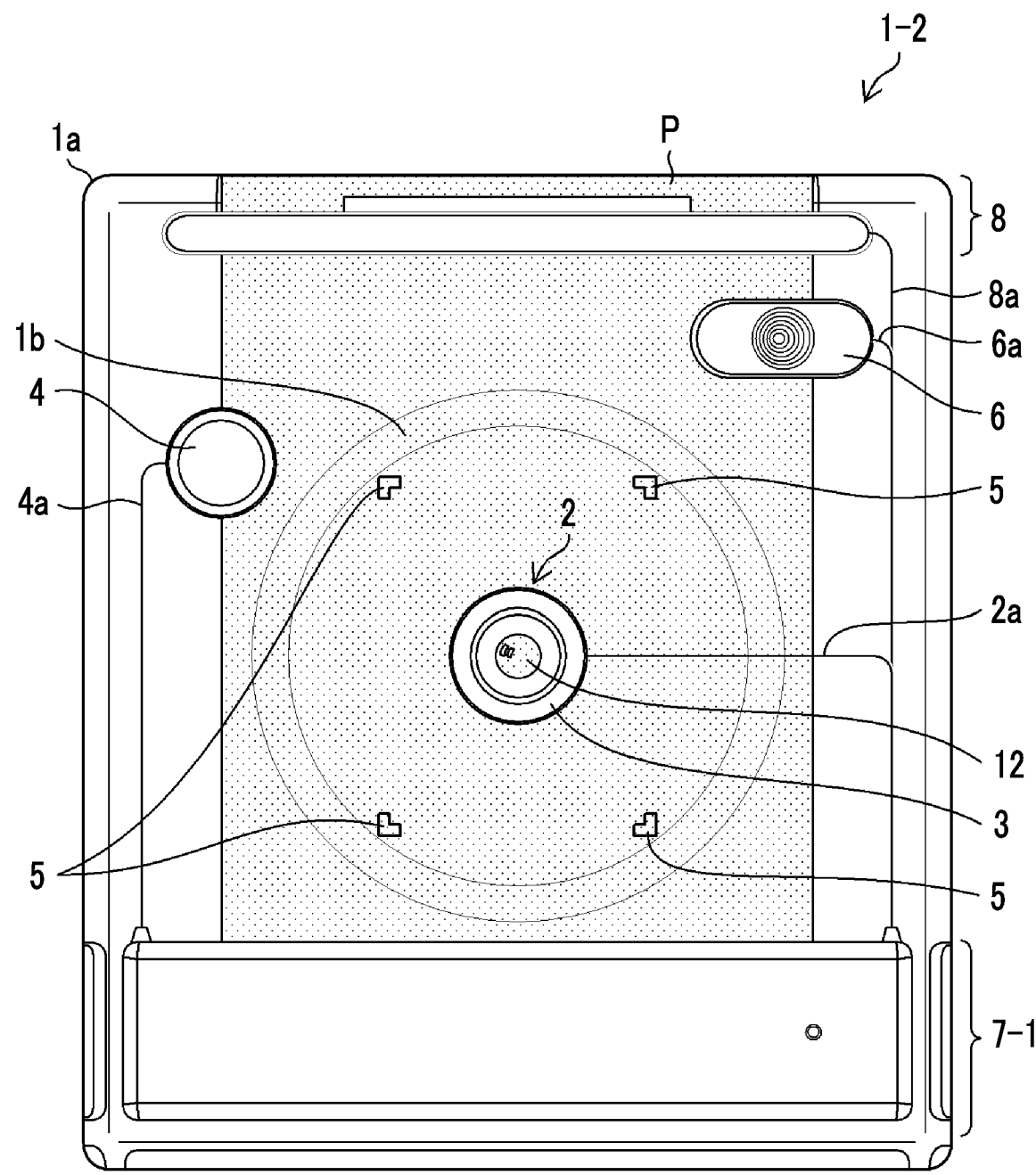
FIG. 14 is a diagram illustrating a state where the print paper reaches the upper portion of the imaging apparatus of the second embodiment, and printing of an image on the print paper is started.
Figure 15:
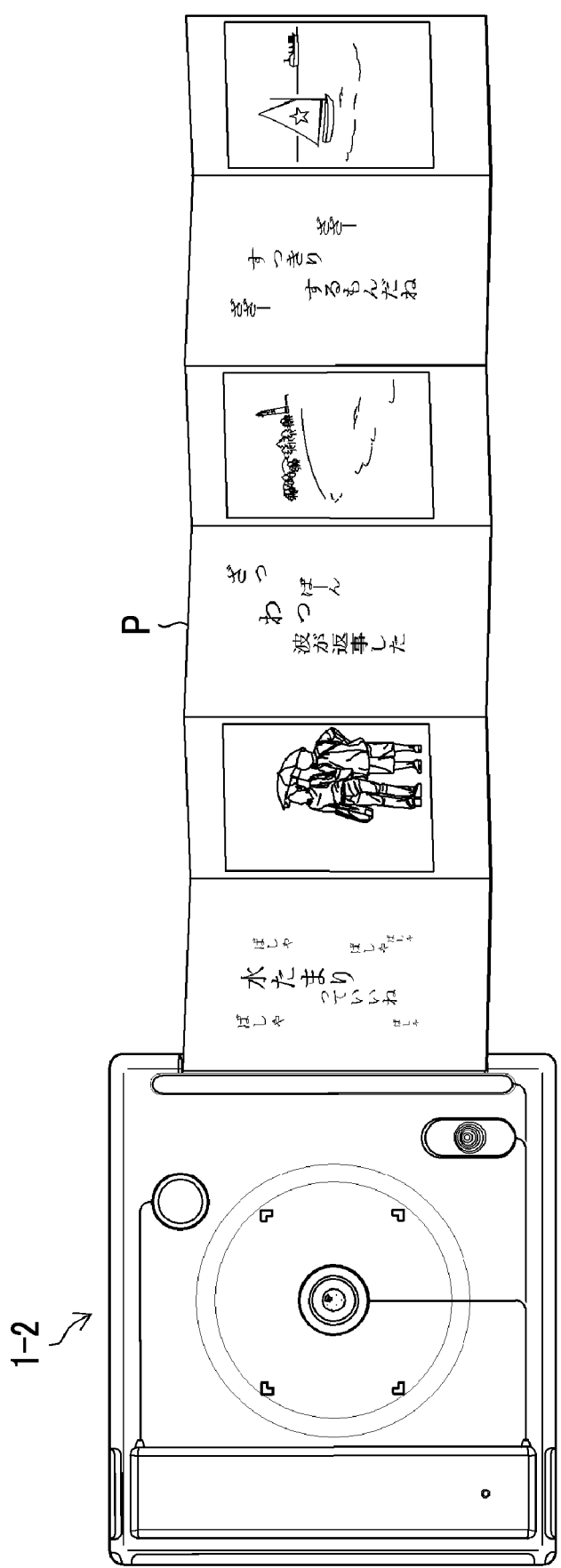
FIG. 15 is a diagram illustrating the print paper and the like output as a print by a print unit of the imaging apparatus of the second embodiment.

FIG. 12 to FIG. 15 are diagrams illustrating a state where the combined photograph is printed under control of the print control unit 232. FIG. 15 illustrates a case where the text language is Japanese.

In a case where the print control unit 232 generates the print image data of the seven sets, then, the print control unit 232 controls the print paper dispensing mechanism that is a part of the first content 7-1, and rotates the shaft of the cartridge accommodated as the first content 7-1. Accordingly, print paper P is dispensed from the cartridge. The print image data may be generated by the start of printing by the print head 56 at the latest.

Figure 12:
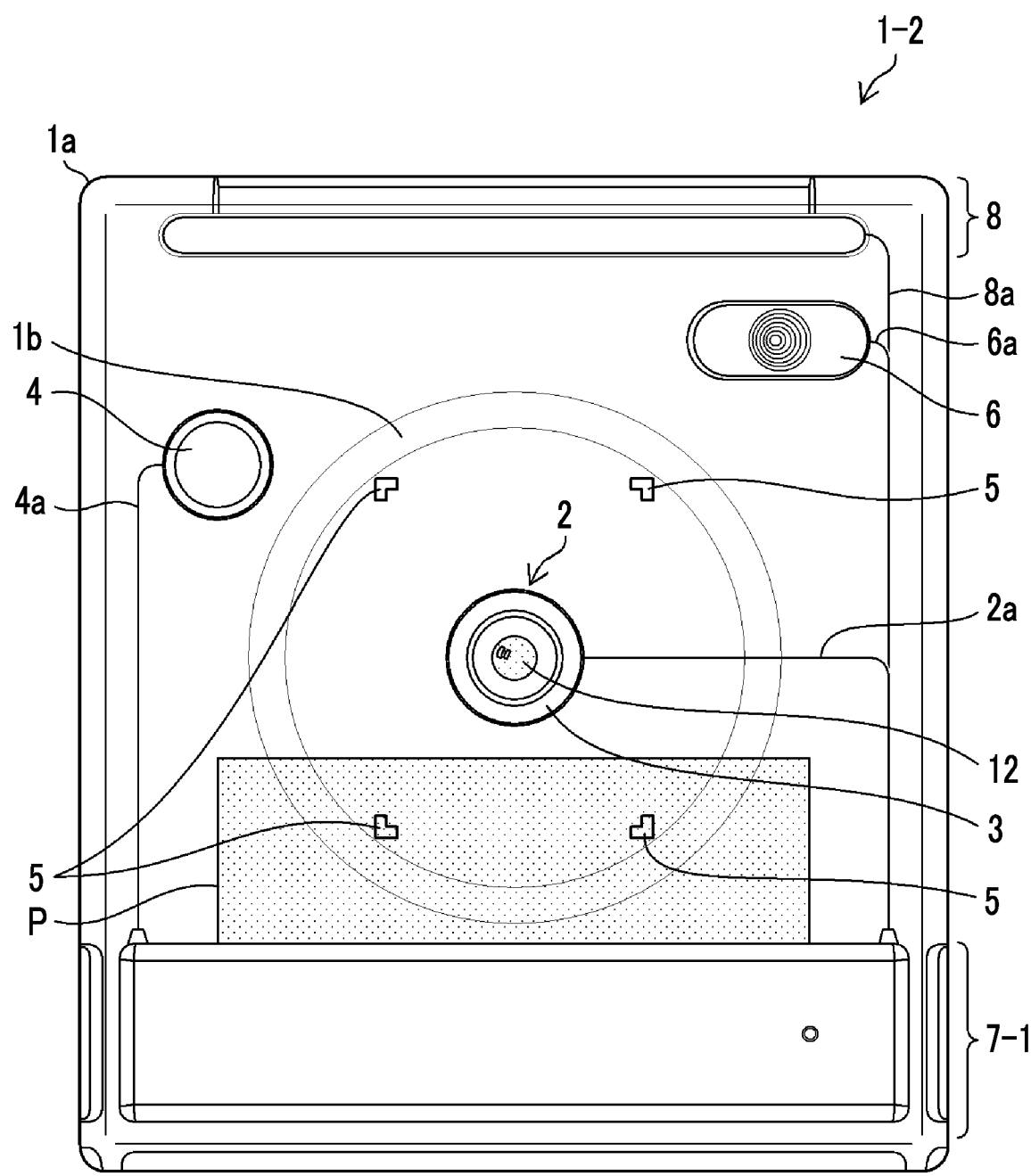
FIG. 12 is a diagram illustrating a state where print paper is dispensed from a lower portion to an upper portion of the imaging apparatus of the second embodiment.

FIG. 12 and FIG. 13 are diagrams illustrating a state where the print paper P is dispensed from the lower portion to the upper portion of the imaging apparatus 1-2. Since the casing 1a and the display unit of the imaging apparatus 1-2 are transparent, the print paper P dispended from the lower portion to the upper portion of the imaging apparatus 1-2 can be visually recognized.

As illustrated in FIG. 14, in a case where the tip end of the print paper P dispensed from the cartridge reaches the print paper transport mechanism 54 that is arranged as a part of the second content 8 in the upper portion of the imaging apparatus 1-2, the print paper P is transported by the print paper transport mechanism 54 under control of the print control unit 232. In synchronization of the transport of the print paper P, the print control unit 232 drives the print head 56 through the print head drive unit 236 based on the print image data and prints the captured image and the text image on the print paper P.

In addition, the display control unit 246 of the present example reads the motion picture data of the animation of the text recorded in the internal memory 222 in step S56 and displays the animation of the text on the display unit 22 in accordance with the timing of printing the text image.

Accordingly, the text constituting the text image printed on the print paper P can be visually recognized in advance. The text printed as the text image is selected from the text displayed on the display unit 22 and thus, is smaller than the displayed text. However, by comparing the text displayed on the display unit 22 with the printed text image, a text used for generating the text image and a text not used for generating the text image can be checked.

The animation of the text displayed on the display unit 22 flows from one end to the other end of the display unit 22. However, the animation is not for limitation purposes. The display control unit 246 may move the text in the discharge direction of the print paper P in accordance with the printing speed of the text image, generate motion picture data in which the text is reduced in response to the discharge of the print paper P of the text, and display the animation of the text on the display unit 22 based on the motion picture data.

FIG. 15 is a diagram illustrating the print paper P (long photo print) or the like output as a print by the print unit of the imaging apparatus 1-2 and illustrates the print paper P on which three sets of images (the captured image+the text image) are printed.

In the print paper P, it is preferable that a boundary between the captured image and the text image of each set is folded for a valley fold, and a boundary between each set is folded for a mountain fold. Accordingly, the long photo print after the printing can be stored by folding the photo print on the folds.

In the print unit of the imaging apparatus 1-2 of the second embodiment, the print paper P moves from the lower end side to the upper end side of the casing 1a. However, the print unit is not for limitation purposes and may be configured such that the print paper does not move in the casing.

Figure 16:
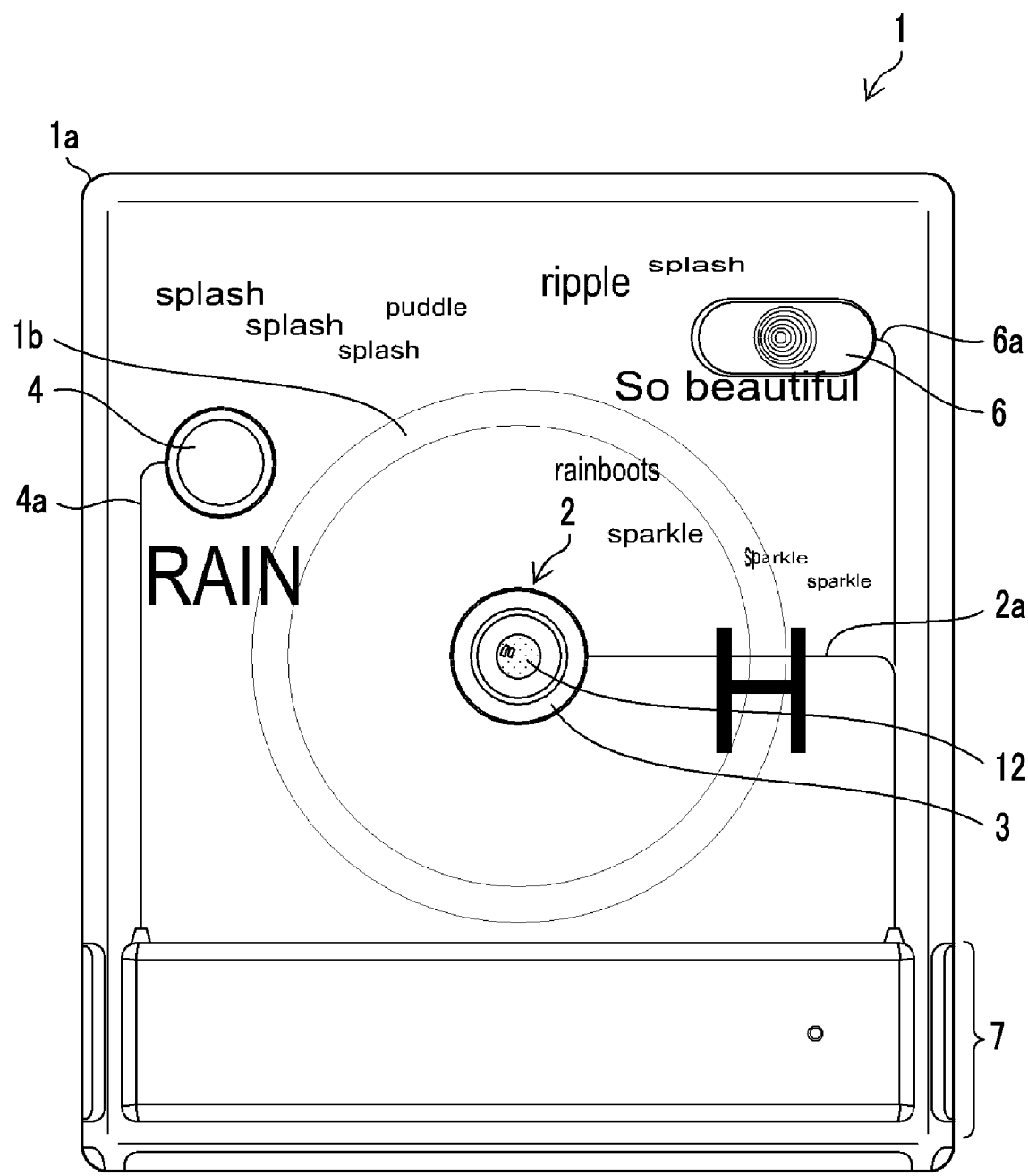
FIG. 16 is a front view of the imaging apparatus illustrated in FIG. 3 and is particularly a diagram illustrating a state where an English text is displayed on an apparatus main body.
Figure 17:
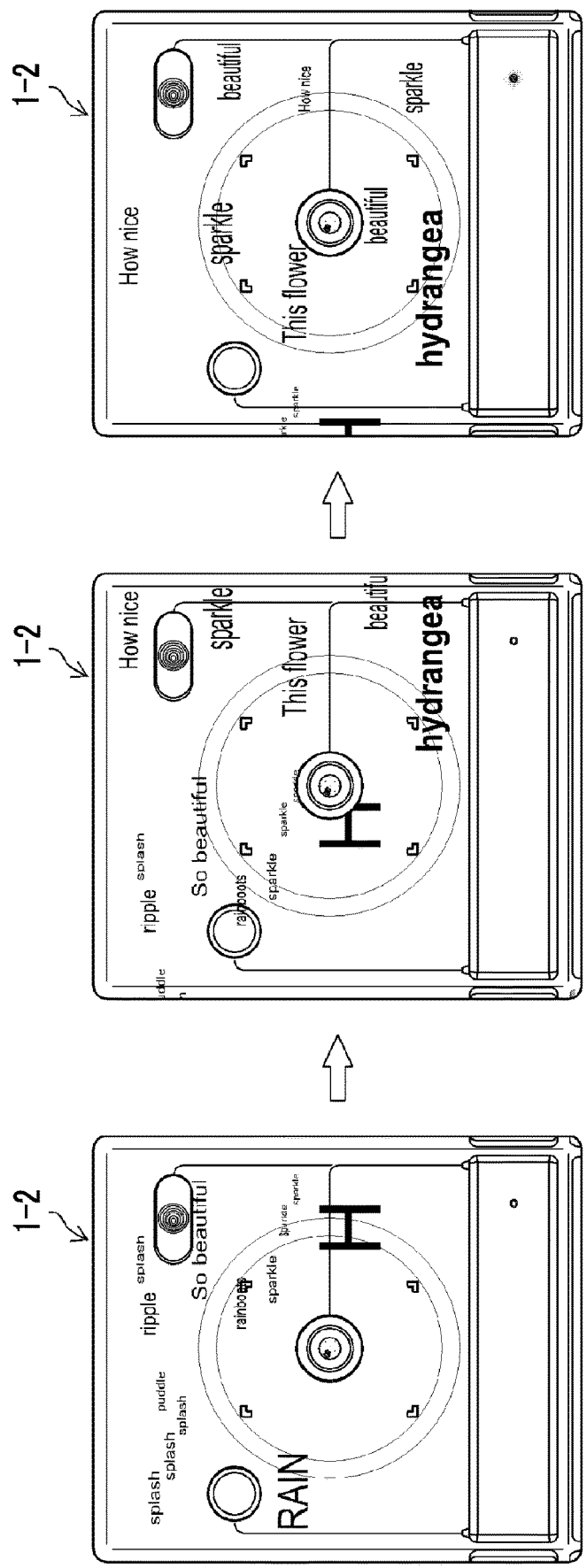
FIG. 17 is a diagram illustrating a state where the English text displayed on the apparatus main body of the imaging apparatus illustrated in FIG. 16 moves.
Figure 18:
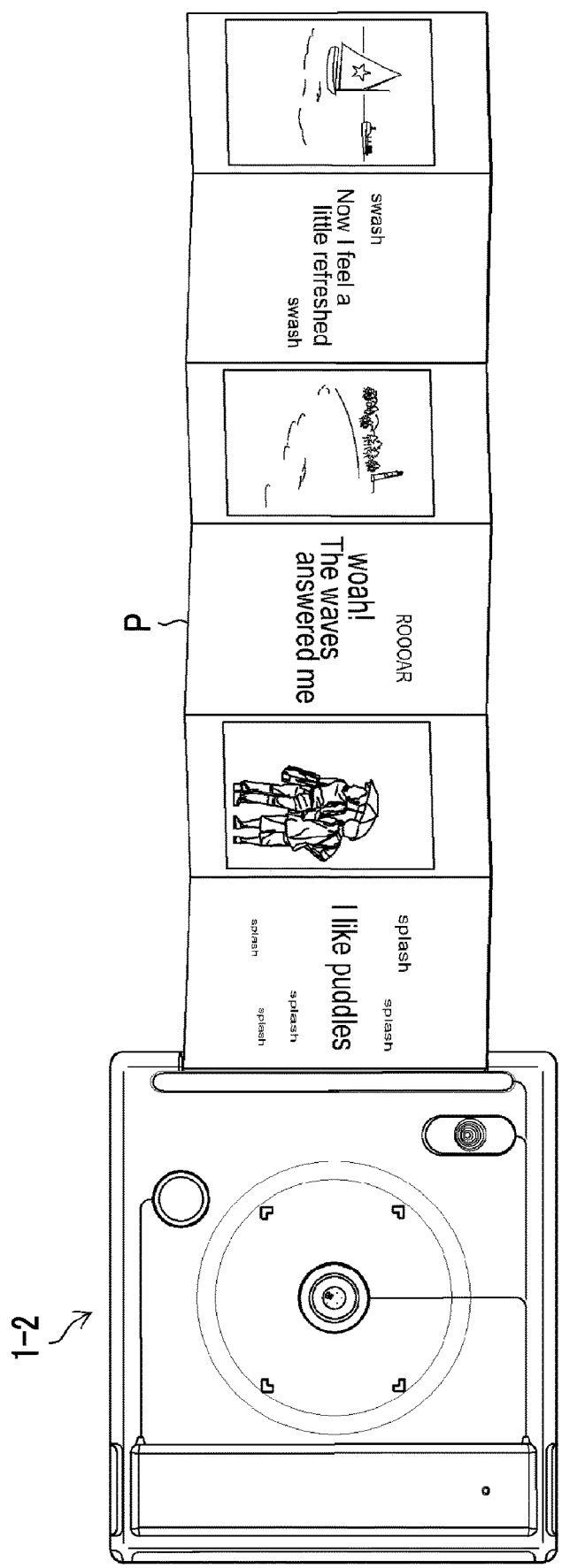
FIG. 18 is a diagram illustrating the print paper and the like output as a print by the print unit of the imaging apparatus illustrated in FIG. 15 and is particularly a diagram illustrating a state where a combined photograph in which the image and the English text are combined is printed.

In addition, as described above, in a case where a specific text language (for example, English) is selected by the language selection unit, the text generation unit 230 can generate an English text language from the selected English audio language. The display control unit 246 displays an English text on the display unit 22 as illustrated in FIG. 16 based on the generated English text language. In this case, in the same manner as the embodiment illustrated in FIG. 9, the English text displayed on the display unit 22 is displayed as an animation (animation in which the text moves) as illustrated in FIG. 17. Furthermore, in a case where the English text language is generated, the print control unit 232 causes the print unit to print a combined photograph in which the image and the English text are combined as illustrated in FIG. 18.

[Others]

In the present embodiment, the text image is generated based on the text generated from the sound data, and the generated text image is recorded in the internal memory in association with the captured image. However, the embodiment is not for limitation purposes. The text (text data) generated from the sound data may be recorded in association with the captured image (for example, as a part of header information of an image file of the captured image).

In addition, the captured image and the text image (or the text data) may be recorded in a memory card that is attachable and detachable with respect to the casing, or may be transferred to an external apparatus such as a personal computer through an interface of wired or wireless communication.

In the present embodiment, the text is correctly displayed in a case where the imaging apparatus is seen from the front surface of the imaging apparatus, and the text is inversely displayed (mirror image) in a case where the imaging apparatus is seen from the rear surface of the imaging apparatus (FIG. 6). However, the embodiment is not for limitation purposes. The text may be correctly displayed in a case where the imaging apparatus is seen from the rear surface of the imaging apparatus, and the text may be inversely displayed in a case where the imaging apparatus is seen from the front surface of the imaging apparatus. Alternatively, the text may be displayed by appropriately switching the text depending on a direction in which the text is seen.

The present invention is not limited to the embodiments, and various modifications can be made without departing from the spirit of the present invention.

EXPLANATION OF REFERENCES 1, 1-2: imaging apparatus
1a: casing
1b: protruding portion
2: imaging unit
2a, 4a, 6a: wire
3: microphone
4: shutter release switch
5: finder frame
6: flash light emission unit
7: content
7-1: first content
8: second content
12: imaging lens
12a: stop
12b: shutter
22, 22a, 22b, 22c: display unit
42: image sensor
54: print paper transport mechanism
56: print head
212: imaging lens drive unit
214: image sensor drive unit
216: analog signal processing unit
218: image data input unit
220: digital signal processing unit
222: internal memory
230: text generation unit
232: print control unit
234: print paper transport mechanism drive unit
236: print head drive unit
240: system controller
242: work memory
244: data memory
246: display control unit
247: microphone drive unit
248: operation unit
249: flash control unit
250: power supply unit
P: print paper
S10 to S24, S50 to S62: step

What is claimed is:

1. An imaging apparatus comprising:
a transparent casing;
an imager that is arranged in the casing and is configured to acquire a captured image of a subject;
a transparent display that is arranged in the casing and includes a display screen orthogonal to an imaging direction of the imager;
a sound collector configured to acquire an ambient sound; and
a processor configured to:
generate a text representing an animate phonomime corresponding to the ambient sound acquired by the sound collector; and
display the generated text on the display.

2. The imaging apparatus according to claim 1, wherein in the imaging apparatus, an area larger than or equal to half of a projection area of the imaging apparatus in the imaging direction of the imager is transparent from an ocular side to an objective side due to the transparent casing and the transparent display.

3. The imaging apparatus according to claim 1, wherein the processor is further configured to:
perform image analysis on the captured image acquired by the imager; and
generate the text based on a result of the image analysis.

4. The imaging apparatus according to claim 1, wherein the processor is configured to display an animation composed of the generated text on the display.

5. The imaging apparatus according to claim 1, wherein the processor is configured to display, on the display, an animation that is composed of the generated text and in which the text moves from one end to the other end of the display screen of the display.

6. The imaging apparatus according to claim 1, wherein the display is arranged inside the casing.

7. The imaging apparatus according to claim 1, wherein:
the display is formed of a plurality of displays that are parallelly arranged at intervals in the casing, and
the processor is configured to display the generated text on each of the plurality of displays.

8. The imaging apparatus according to claim 1, wherein the processor is configured to decide at least one of a size, a shade, or a font of the generated text depending on the text.

9. The imaging apparatus according to claim 1, wherein a finder frame that is centered at the imager is disposed in the casing, or the processor is configured to display a finder frame centered at the imager on the display.

10. The imaging apparatus according to claim 1, further comprising a printer that is arranged in the casing and is configured to print the captured image acquired by the imager and the generated text.

11. A text display method for an imaging apparatus including a transparent casing, an imager that is arranged in the casing and is configured to acquire a captured image of a subject, and a transparent display that is arranged in the casing and includes a display screen orthogonal to an imaging direction of the imager, the method comprising:
collecting an ambient sound by a sound collector;
generating a text representing an animate phonomime corresponding to the ambient sound; and
displaying the text on the display.

12. The text display method according to claim 11, wherein in the imaging apparatus, an area larger than or equal to half of a projection area of the imaging apparatus in the imaging direction of the imager is transparent from an ocular side to an objective side due to the transparent casing and the transparent display.

13. The text display method according to claim 11, further comprising:
performing image analysis on the captured image acquired by the imager,
wherein in the text generating, the text is generated based on a result of the image analysis.

14. The text display method according to claim 11, wherein in the text displaying, an animation composed of the generated text is displayed on the display.

15. The text display method according to claim 11, wherein in the text displaying, an animation that is composed of the generated text and in which the text moves from one end to the other end of the display screen of the display is displayed on the display.

16. The imaging apparatus according to claim 3, wherein the processor is configured to:
extract an object in the captured image acquired by the imager; and
generate the text indicating the extracted object.

17. The imaging apparatus according to claim 3, wherein the processor is configured to:
determine a scene from the captured image acquired by the imager; and
generate the text indicating the determined scene.

18. The text display method according to claim 13, wherein:
in the image analysis, an object is extracted in the captured image acquired by the imager; and
in the text generating, the text indicating the extracted object is generated.

19. The text display method according to claim 13, wherein:
in the image analysis, a scene is determined from the captured image acquired by the imager; and
in the text generating, the text indicating the determined scene is generated.

* * * * *